(12) United States Patent
Hirano et al.

(10) Patent No.: US 7,110,207 B2
(45) Date of Patent: Sep. 19, 2006

(54) LOAD/UNLOAD OPERATION CONTROL METHOD AND STORAGE APPARATUS

(75) Inventors: Masakazu Hirano, Kawasaki (JP); Nobuyuki Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 190 days.

(21) Appl. No.: 09/965,615

(22) Filed: Sep. 27, 2001

(65) Prior Publication Data

US 2002/0154438 A1 Oct. 24, 2002

(30) Foreign Application Priority Data

Apr. 23, 2001 (JP) .............................. 2001-124821

(51) Int. Cl.
*G11B 21/02* (2006.01)

(52) U.S. Cl. ....................................................... 360/75
(58) Field of Classification Search .................. 360/75, 360/73.01, 78.01, 78.04, 78.05
See application file for complete search history.

(56) References Cited

U.S. PATENT DOCUMENTS

| | | | |
|---|---|---|---|
| 4,755,892 A | 7/1988 | Carteau et al. ............... | 360/75 |
| 5,315,455 A * | 5/1994 | Ito ............................... | 360/75 |
| 5,760,992 A * | 6/1998 | Phan et al. ............... | 360/78.07 |
| 5,825,575 A | 10/1998 | Lee ............................. | 360/75 |
| 5,982,570 A * | 11/1999 | Koizumi et al. .............. | 360/69 |
| 6,108,157 A | 8/2000 | Yoneda et al. ................ | 360/75 |
| 6,212,027 B1 | 4/2001 | Lee et al. ................. | 360/78.14 |
| 6,236,527 B1 * | 5/2001 | Uchiike et al. ............... | 360/75 |
| 6,583,964 B1 * | 6/2003 | Huang et al. ............ | 360/294.4 |

FOREIGN PATENT DOCUMENTS

| | | |
|---|---|---|
| JP | 05-210419 | 8/1993 |
| JP | 07-334950 | 12/1995 |
| JP | 10-255419 | 9/1998 |
| JP | 10-326470 | 12/1998 |
| JP | 11-016259 | 1/1999 |
| JP | 2000-021103 | 1/2000 |
| JP | 2001-43645 | 2/2001 |

* cited by examiner

*Primary Examiner*—Wayne Young
*Assistant Examiner*—Daniell L. Negrón
(74) *Attorney, Agent, or Firm*—Greer, Burns & Crain, Ltd

(57) ABSTRACT

A storage apparatus is provided with a load/unload mechanism which carries out a ramp load/unload operation to load/unload a head which is provided on an arm with respect to a recording medium by a driving part which drives the arm, and a controller controlling a driving current which is supplied to the driving part so as to undergo a gradual change during at least one of a load operation and an unload operation.

17 Claims, 20 Drawing Sheets

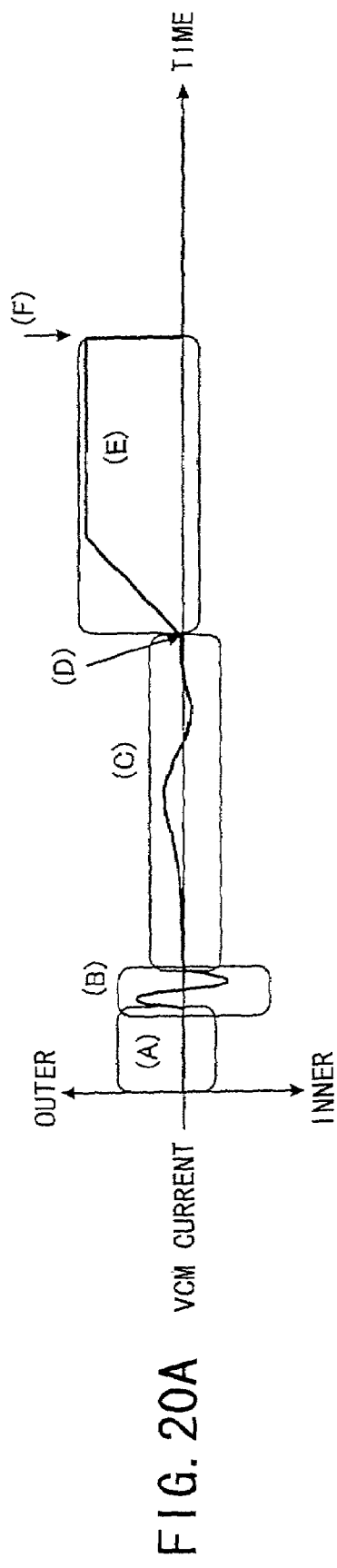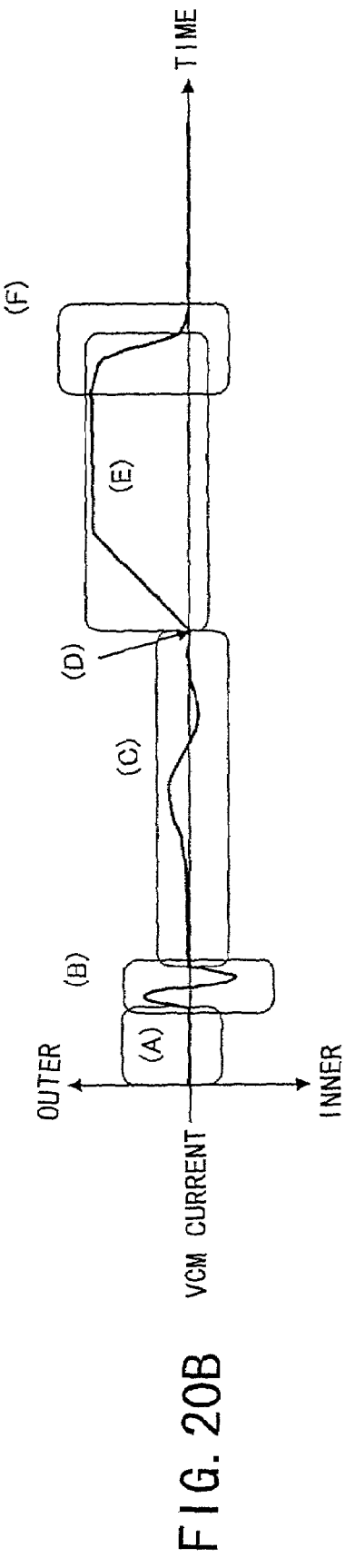
FIG. 20A
FIG. 20B

LOAD/UNLOAD OPERATION CONTROL METHOD AND STORAGE APPARATUS

This application claims the benefit of a Japanese Patent Application No.2001-124821 filed Apr. 23, 2001, in the Japanese Patent Office, the disclosure of which is hereby incorporated by reference.

BACKGROUND OF THE INVENTION

1. Field of the Invention

The present invention generally relates to load and/or unload operation control methods (hereinafter simply referred to as load/unload operation control methods) and storage apparatuses, and more particularly to a load/unload operation control method which controls a load operation which loads a recording and/or reproducing means such as a magnetic head with respect to a recording medium and/or controls an unload operation which unloads the recording and/or reproducing means from the recording medium, and to a storage apparatus which employs such a load/unload operation control method.

In a magnetic disk unit, a magnetic head is provided on a tip end of an arm, and a recording and/or reproducing (hereinafter simply referred to as recording/reproducing) of information with respect to a desired position on a magnetic disk is carried out by moving the arm. In a state where no information recording/reproducing is carried out, the magnetic head is unloaded from a position above the recording surface of the magnetic disk to a parking area, so that the magnetic head will not hit the magnetic disk when an external disturbance such as shock and vibration is applied on the magnetic disk unit. By unloading the magnetic head to the parking area, it is possible to prevent damage to the magnetic head and/or the magnetic disk due to the collision therebetween. When resuming the information recording/reproducing, the magnetic head at the parking area is loaded to a desired position above the recording surface of the magnetic disk.

2. Description of the Related Art

In order to prevent collision of the magnetic head and the magnetic disk during the load/unload operation, the arm is designed to move on a ramp member. More particularly, during the unload operation, the arm moves from a state where the magnetic head is positioned above the recording surface of the magnetic disk, moves up on a first sloping part of the ramp member, moves on a horizontal part of the ramp member, moves down on a second sloping part of the ramp member, and finally reaches the parking area. During the load operation, the arm moves in a sequence in reverse to that during the unload operation. For example, the arm is moved by a driving means such as a voice coil motor (VCM).

In addition, in order to prevent the magnetic head in the parking area from moving above the recording surface of the magnetic disk due to external shock or vibration, the arm in the parking area is held by a mechanical catch such as a magnetic catch in a state where the magnetic head is located in the parking area, so as to hold the magnetic head in the parking area.

Conventionally, in order to positively separate the arm in the parking area from the magnetic catch when carrying out the load operation, a current supplied to the VCM is sharply increased. In addition, in order to make the arm positively ride over the sloping part of the ramp member during the load operation, the current supplied to the VCM is sharply increased. Furthermore, during the unload operation, the current supplied to the VCM is sharply decreased when the arm reaches the parking area.

However, there was a problem in that mechanical noise is generated in the conventional magnetic disk unit because of the need to sharply change the current supplied to the VCM. The mechanical noise is particularly unpleasant to the user in information processing apparatuses in which the load/unload operation is frequently carried out. Such information processing apparatuses include portable information processing apparatuses which use a battery as a power source, wherein a power save mode is provided to reduce unnecessary power consumption and the load/unload operation is frequently carried out in order to prevent collision of the magnetic head and the magnetic disk.

Of course, the above described problems are not peculiar to magnetic disk units, and similar problems were generated in storage apparatuses provided with the so-called ramp load/unload mechanism.

SUMMARY OF THE INVENTION

Accordingly, it is a general object of the present invention to provide a novel and useful load/unload operation control method and storage apparatus, in which the problems described above are eliminated.

Another and more specific object of the present invention is to provide a load/unload operation control method and storage apparatus, which can suppress generation of mechanical noise during a load/unload operation.

Still another object of the present invention is to provide a load/unload operation control method for controlling a load/unload operation which loads/unloads a head which is provided on an arm with respect to a recording medium by a ramp load/unload mechanism, comprising a control step controlling a driving current which is supplied to a driving part which drives the arm so as to undergo a gradual change during at least one of a load operation and an unload operation. According to the load/unload operation control method of the present invention, it is possible to suppress the generation of mechanical noise during the load/unload operation.

A further object of the present invention is to provide a storage apparatus comprising a load/unload mechanism which carries out a ramp load/unload operation to load/unload a head which is provided on an arm with respect to a recording medium by a driving part which drives the arm, and a controller controlling a driving current which is supplied to the driving part so as to undergo a gradual change during at least one of a load operation and an unload operation. According to the storage apparatus of the present invention, it is possible to suppress the generation of mechanical noise during the load/unload operation.

In the load/unload operation control method and the storage apparatus described above, the driving current may be changed in steps which do not exceed a predetermined amount of change.

Other objects and further features of the present invention will be apparent from the following detailed description when read in conjunction with the accompanying drawings.

BRIEF DESCRIPTION OF THE DRAWINGS

FIGS. 20A and 20B are diagrams respectively showing the VCM current during the unload operation for the normal mode and the silent mode;

DESCRIPTION OF THE PREFERRED EMBODIMENTS

Figures 1A, 1B:
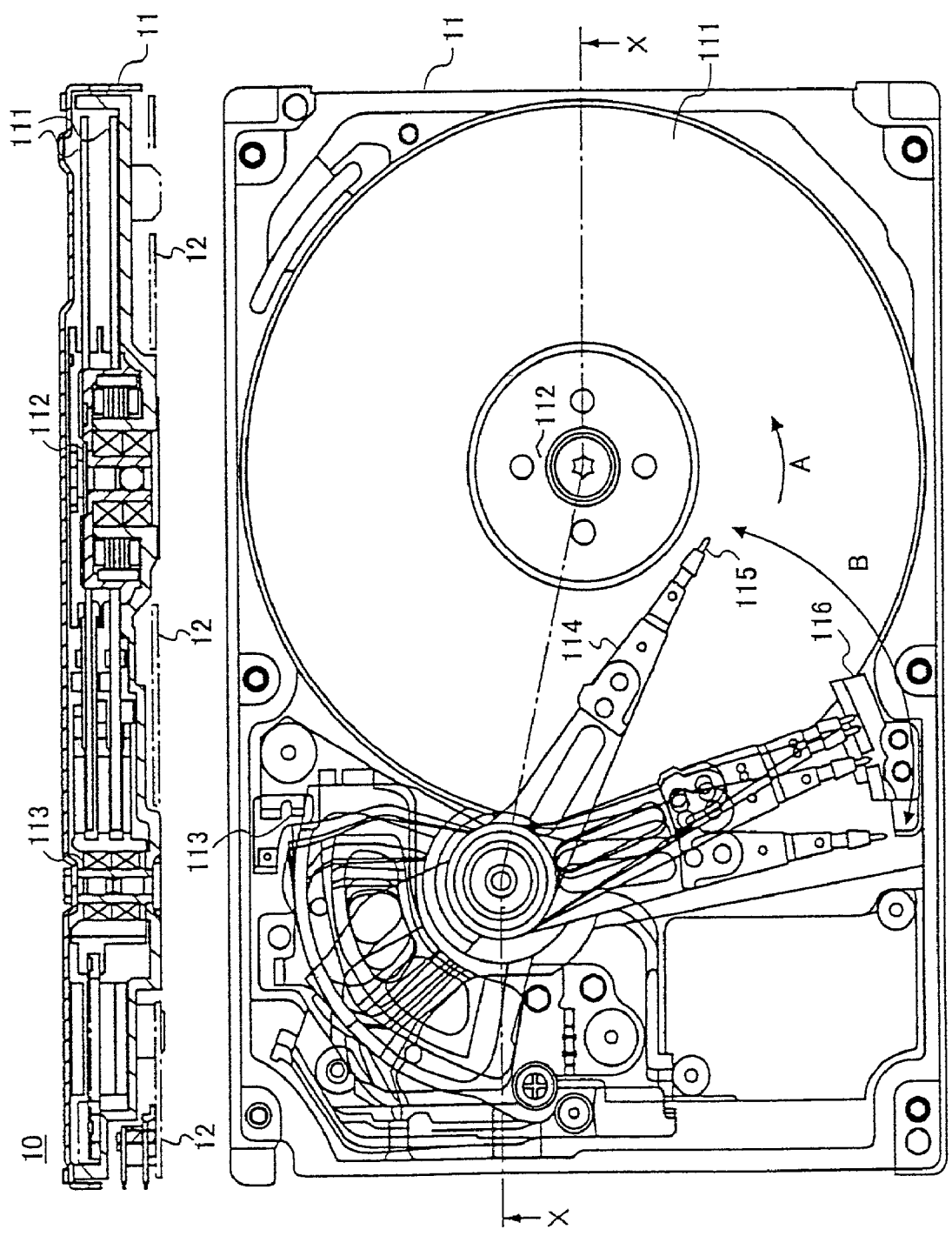
FIGS. 1A and 1B are a cross sectional view and a plan view showing an embodiment of a storage apparatus according to the present invention.

FIGS. 1A and 1B are diagrams respectively showing an embodiment of a storage apparatus according to the present invention. FIG. 1B is a plan view of the storage apparatus, and FIG. 1A is a cross sectional view taken along a line X—X in FIG. 1B. In this embodiment, the present invention is applied to a magnetic disk unit, that is, a hard disk drive (HDD). This embodiment of the storage apparatus employs an embodiment of a load/unload operation control method according to the present invention.

In FIG. 1, a HDD 10 generally includes a disk enclosure (DE) 11 and a printed circuit assembly (PCA) 12. For the sake of convenience, it is assumed that two magnetic disks 111, which are rotated in an arrow direction A by a spindle motor (SPM) 112, are accommodated within the disk enclosure 11. In addition, an arm 114 which is driven by a voice coil motor (VCM) 113, is provided within the disk enclosure 11 in a manner movable in an arrow direction B. A magnetic head 115 is provided on a tip end of the arm 114. Two arms 114 and two magnetic heads 115 are provided since two magnetic disks 111 are provided in this embodiment. The magnetic head 115 can move in a radial direction of the magnetic disk 111 and record and/or reproduce information with respect to a desired track on the magnetic disk 111. During an unload operation, the arm 114 is receded to a parking area other than above a recording surface of the magnetic disk 111, by a ramp mechanism 116 which will be described later.

In this embodiment, it is assumed for the sake of convenience that the ramp mechanism 116 is provided at an outer peripheral part of the magnetic disk 111. However, the ramp mechanism 116 may of course be provided at an inner peripheral part of the magnetic disk 111. In addition, the basic structure of the HDD 10 is not limited to that shown in FIG. 1, and various known structures provided with a ramp load/unload mechanism may be employed.

Figure 2:
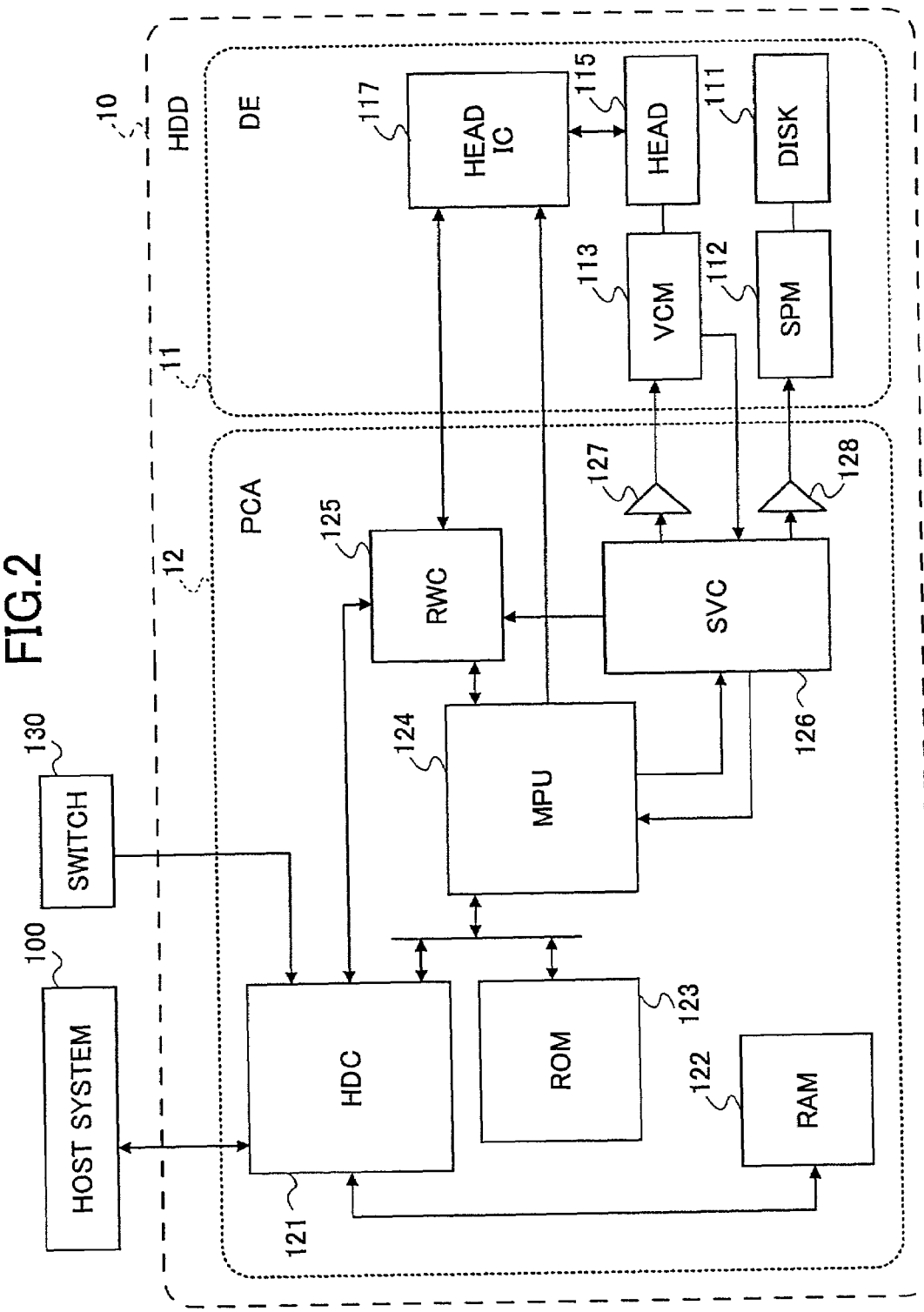
FIG. 2 is a system block diagram showing a circuit structure of the storage apparatus.

FIG. 2 is a system block diagram showing a circuit structure of the HDD 10. In FIG. 2, those parts which are the same as those corresponding parts in FIG. 1 are designated by the same reference numerals, and a description thereof will be omitted. As shown in FIG. 2, a head IC 117 which supplies a write signal to the magnetic head 115 and receives a read signal from the magnetic head 115, is provided within the disk enclosure 11.

On the other hand, a hard disk controller (HDC) 121 which connects to a host system 100 such as a personal computer, a RAM 122, a flash ROM 123, a MPU 124, a read channel (RWC) 125, a servo controller (SVC) 126, and drivers 127 and 128 are provided within the PCA 12. Further, a load/unload (LUL) switch 130 connects to the HDC 121.

The write signal from the host system 100 is temporarily stored in the RAM 122 via the HDC 121, before being supplied to the magnetic head 115 via the RWC 125 and the head IC 117 under the control of the MPU 124. The write signal supplied to the magnetic head 115 is recorded on the magnetic disk 111. The read signal which is reproduced from the magnetic disk 111 by the magnetic head 115 is supplied to the RWC 125 via the head IC 117, and is temporarily stored in the RAM 122 via the HDC 121 under the control of the MPU 124, before being supplied to the host system 100 via the HDC 121.

The MPU 124 executes a program stored in the ROM 123, so as to control the SPM 112 via the SVC 126 and the driver 128, and to control the VCM 113 via the SVC 126 and the driver 127. The VCM 113 drives the arm 114 so that the magnetic head 115 is loaded above the recording surface of the magnetic disk 111 from the ramp mechanism 116 during a load operation, and so that the magnetic head 115 is unloaded from above the recording surface of the magnetic disk 111 to the ramp mechanism 116 during the unload operation. In the following description, a driving current which is supplied to the driving part, that is, the VCM 113, will be referred to as a VCM current.

The basic circuit structure of the HDD 10 is of course not limited to that shown in FIG. 2, and various known circuit structures provided with a ramp load/unload mechanism may be employed.

As will be described later, a LUL switch 130 is provided to generate a switching signal which switches and sets the HDD 10 to a normal mode or a silent mode in which the generation of mechanical noise is suppressed. The LUL switch 130 may be formed by a physical switch which is provided in the HDD 10 and is connected to the HDC 121 or, formed by a software switch such as a program. When forming the LUL switch 130 by the software switch, a menu which enables selection of the normal mode or the silent mode is displayed at the host system 100, and mode information (switching signal) dependent on the selection made is supplied to the HDC 121 within the HDD 10 from the host system 100.

Figure 3:
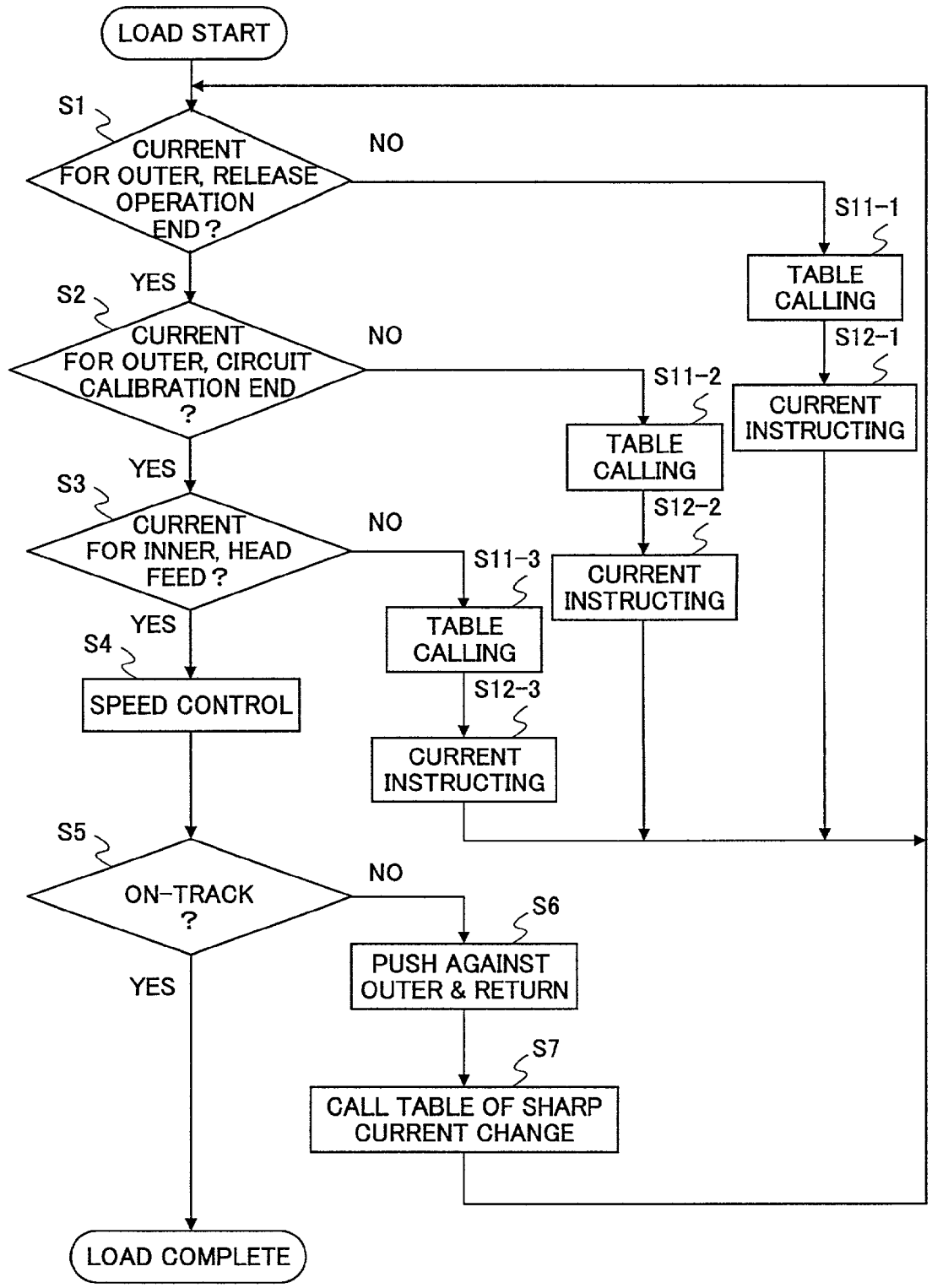
FIG. 3 is a flow chart for explaining a load operation.

Next, a description will be given of the load operation of this embodiment, by referring to FIGS. 3 through 17B. FIG. 3 is a flow chart for explaining the load operation of this embodiment. The process shown in FIG. 3 is carried out by the MPU 124 shown in FIG. 2. In addition, FIG. 9 is a diagram for explaining positions of the magnetic head 115 during the load operation, and for the sake of convenience, the illustration of the arm 114 is omitted in FIG. 9. Further, the details of the ramp mechanism 116 is only shown in FIG. 9(A). As shown in FIG. 9(A), the ramp mechanism 116 includes a first sloping part 116-1, a horizontal part 116-2, a second sloping part 116-3, a parking area 116-4, and a terminal wall 116-5. In FIGS. 9(A) through (F), the present position of the magnetic head 115 is indicated by a symbol "■", and the position of the magnetic head 115 before moving to the present position is indicated by a symbol "□".

In an initial state where the unload operation is completed, the magnetic head 115 is held by a mechanical catch such as a magnetic catch at an intermediate part of the parking area 116-4 as shown in FIG. 9(A). In FIG. 3, a step S1 supplies a VCM current for moving the arm 114 towards an outer peripheral direction of the magnetic disk 111 to the VCM 113, and decides whether or not a release operation which disengages the arm 114 from the magnetic catch has ended. If the decision result in the step S1 is YES, a step S2 decides whether or not a circuit calibration operation which supplies a VCM current for moving the arm 114 towards the outer peripheral direction of the magnetic disk 111 to the VCM 113 has ended. If the decision result in the step S2 is YES, a step S3 supplies a VCM current for moving the arm 114 towards an inner peripheral direction of the magnetic disk 111 to the VCM 113, and decides whether or not a head feed operation with respect to the magnetic head 115 has ended. If the decision result in the step S3 is YES, a step S4 carries out a speed control operation which appropriately controls a moving speed of the arm 114 in the inner peripheral direction. This speed control operation is carried out based on a back-electromotive voltage of the VCM 113 which is fed back to the SVC 126 from the VCM 113 in FIG. 2. A step S5 decides whether or not a desired track on the magnetic disk 111 where the magnetic head 115 is to be loaded during the load operation is reached, that is, whether or not an on-track state is reached. If the decision result in the step S5 is NO, a step S6 supplies a VCM current for moving the arm 114 towards the outer peripheral direction of the magnetic disk 111 to the VCM 113, and returns the HDD 10 to a state where the unload operation has been completed. In addition, a step S7 calls a table of current values which sharply change, which is stored in the ROM 123, similarly to a case where a switching signal which sets the normal mode is received from the LUL switch 130, and the process returns to the step S1. On the other hand, the process ends if the decision result in the step S5 is YES.

If the decision result in the step S1 is NO, a step S11-1 carries out a table calling process, and a step S12-1 carries out a current instructing process, and the process returns to the step S1. If the decision result in the step S2 is NO, a step S11-2 carries out a table calling process, and a step S12-2 carries out a current instructing process, and the process returns to the step S1. If the decision result in the step S3 is NO, a step S11-3 carries out a table calling process, and a step S12-3 carries out a current instructing process, and the process returns to the step S1. The table calling processes of the steps S11-1 through S11-3 are substantially the same, and only the table calling process of the step S11-1 will be described in the following description. In addition, the current instructing processes of the steps S12-1 through S12-3 are substantially the same, and only the current instructing process of the step S12-3 will be described in the following description.

Figure 4:
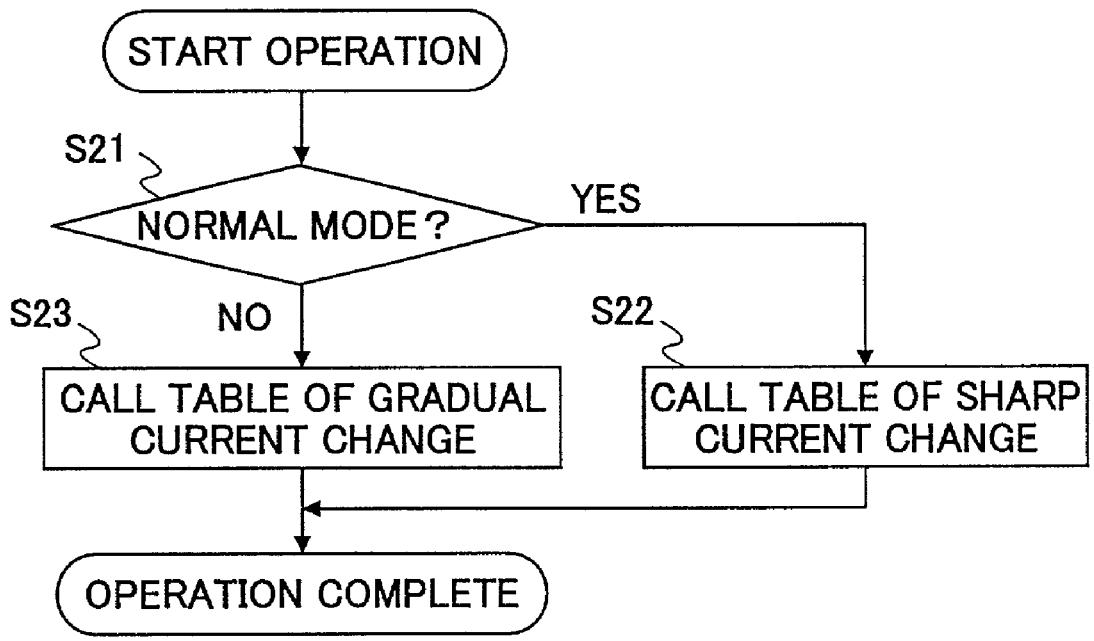
FIG. 4 is a flow chart for explaining a first embodiment of a table calling process.

FIG. 4 is a flow chart for explaining a first embodiment of a table calling process 11-1 of the step S11-1. In FIG. 4, a step S21 decides whether or not the switching signal which sets the normal mode is received from the LUL switch 130. If the decision result in the step S21 is YES, a step S22 calls the table of current values which sharply change, which is stored in the ROM 123, and the table calling process 11-1 ends. On the other hand, if the decision result in the step S21 is NO, a step S23 calls a table of current values which gradually change, which is stored in the ROM 123, and the table calling process 11-1 ends.

Figure 5:
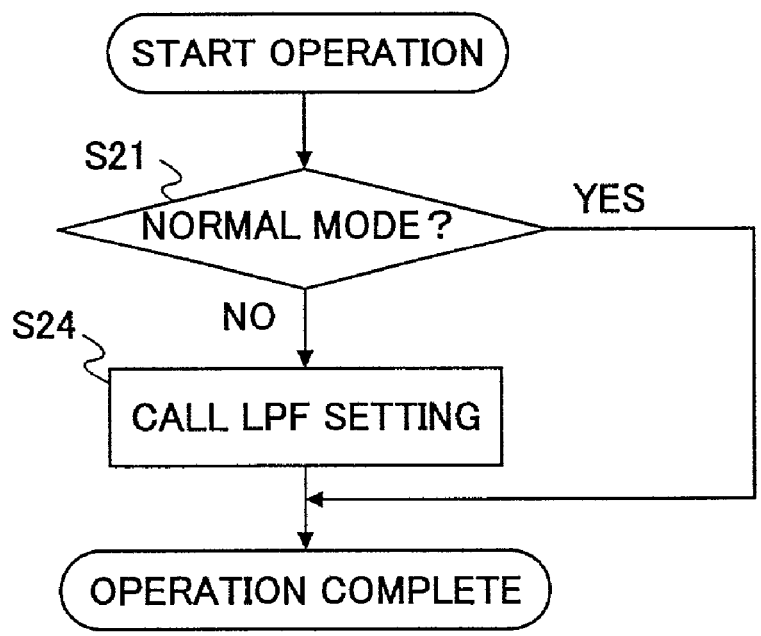
FIG. 5 is a flow chart for explaining a second embodiment of the table calling process.

FIG. 5 is a flow chart for explaining a second embodiment of the table calling process 11-1 of the step S11-1. In FIG. 5, those steps which are the same as those corresponding steps in FIG. 4 are designated by the same reference numerals, and a description thereof will be omitted. In FIG. 5, the table calling process 11-1 ends if the decision result in the step S21 is YES. On the other hand, if the decision result in the step S21 is NO, a step S24 calls a lowpass filter (LPF) setting which is stored in the ROM 123, and the table calling process 11-1 ends.

Figure 6:
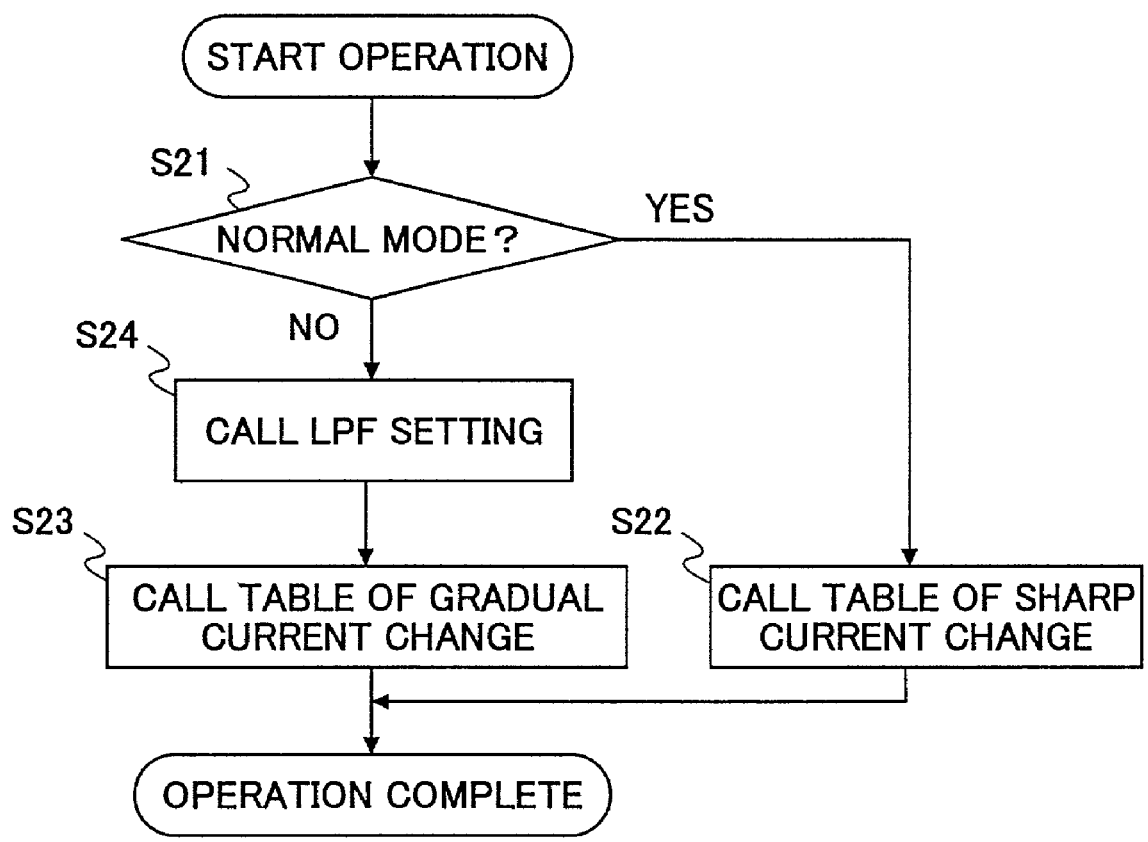
FIG. 6 is a flow chart for explaining a third embodiment of the table calling process.

FIG. 6 is a flow chart for explaining a third embodiment of the table calling process 11-1 of the step S11-1. In FIG. 6, those steps which are the same as those corresponding steps in FIGS. 4 and 5 are designated by the same reference numerals, and a description thereof will be omitted. In FIG. 6, the step S24 is carried out if the decision result in the step S21 is NO, and the table calling process 11-1 ends after carrying out the step S23.

Figure 7:
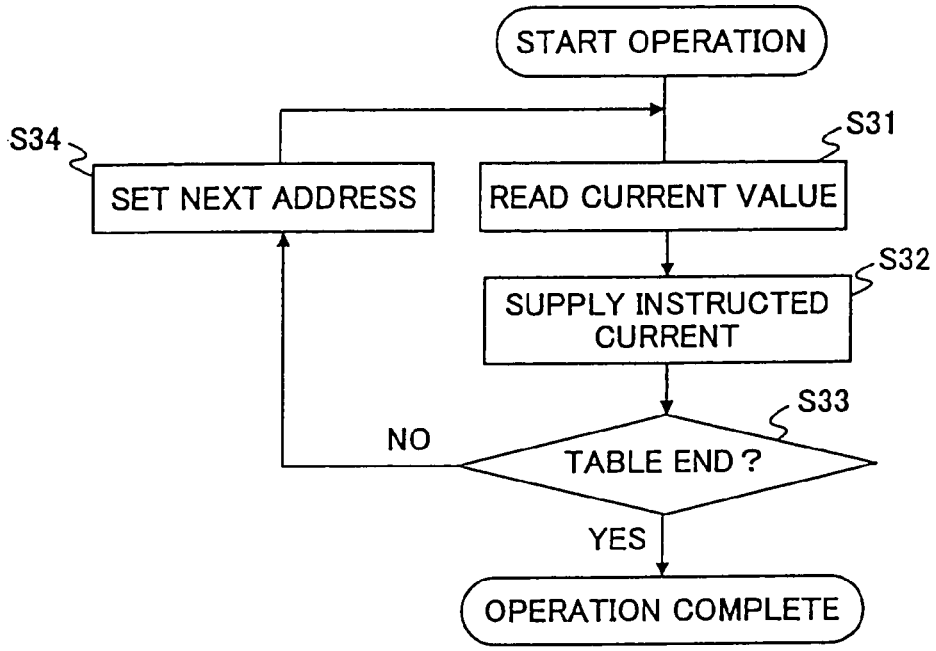
FIG. 7 is a flow chart for explaining a first embodiment of a current instructing process.

FIG. 7 is a flow chart for explaining a first embodiment of a current instructing process 11-2 of the step S11-2. In FIG. 7, a step S31 reads the current values from a starting read address of the table which is called by the table calling process 11-1 shown in FIG. 4, and a step S32 instructs a VCM current to be supplied to the VCM 113 based on the read current values. A step S33 decides whether or not the reading of the current values from the table has ended. If the decision result in the step S33 is NO, a step S34 sets a next read address of the table, and the process returns to the step S31. On the other hand, the current instructing process 11-2 ends if the decision result in the step S33 is YES.

Figure 8:
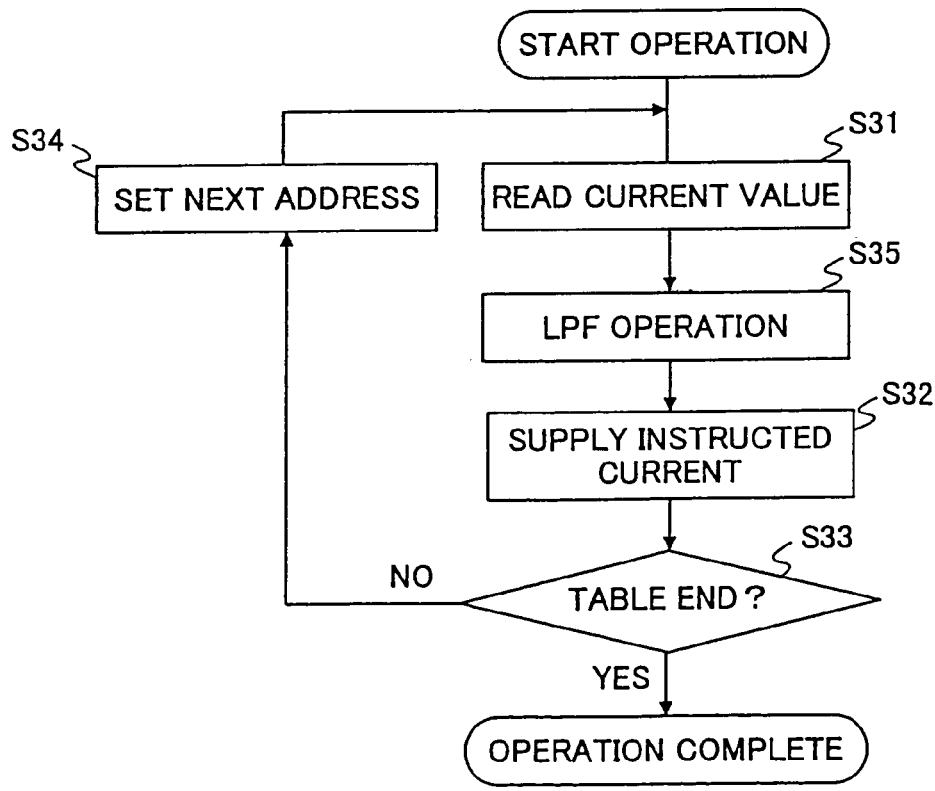
FIG. 8 is a flow chart for explaining a second embodiment of the current instructing process.
Figure 9:
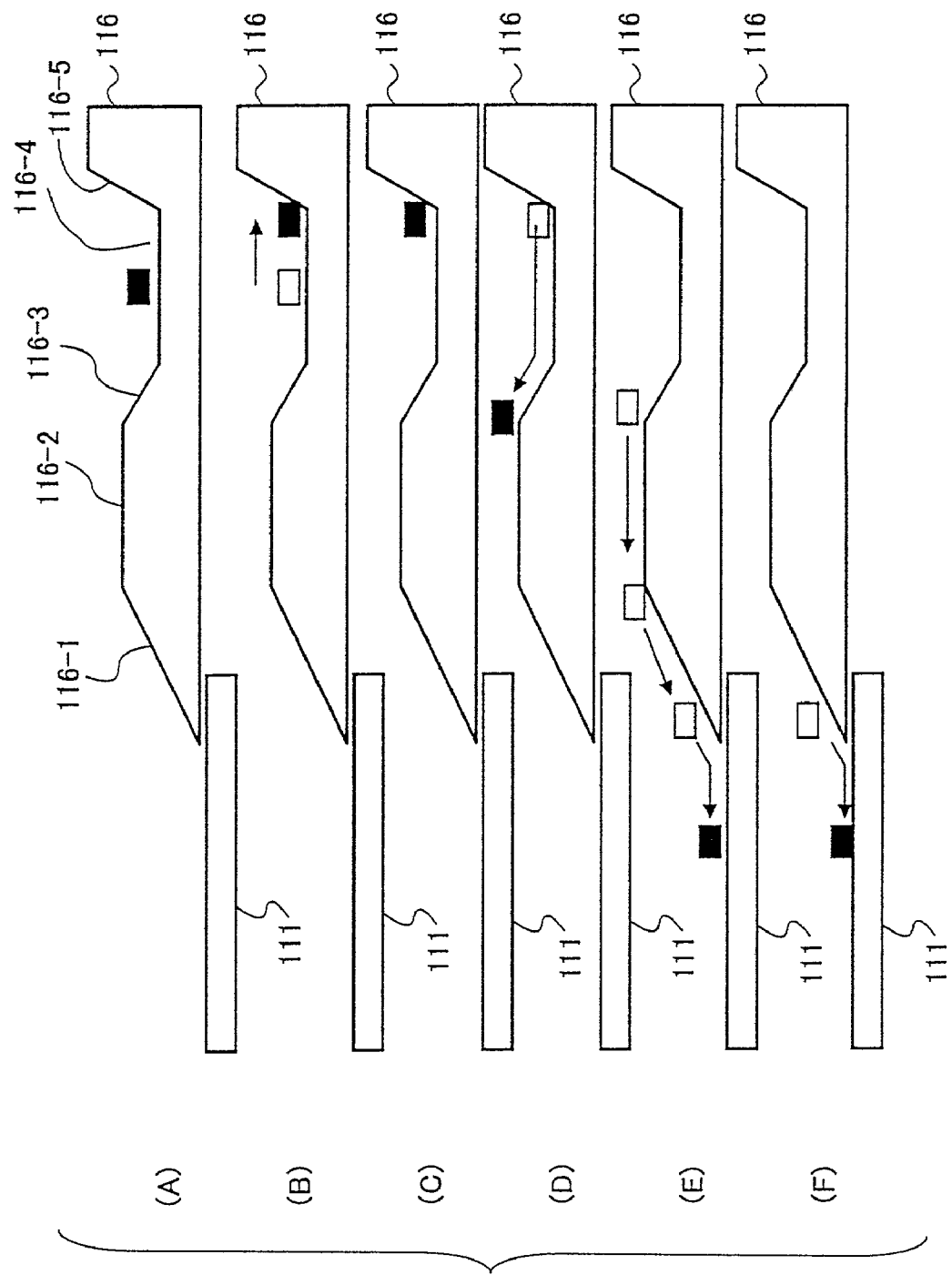
FIG. 9 is a diagram for explaining positions of a magnetic head during the load operation.

FIG. 8 is a flow chart for explaining a second embodiment of the current instructing process 11-2 of the step S11-2. In FIG. 8, those steps which are the same as those corresponding steps in FIG. 7 are designated by the same reference numerals, and a description thereof will be omitted. In FIG. 8, the step S31 reads the current values from a starting read address of the table which is called by the table calling process 11-1 shown in FIG. 5 or 6, and a step S35 carries out a lowpass filter operation of the set lowpass filter with respect to the read current values. Accordingly, the step S32 instructs the VCM current to be supplied to the VCM 113 based on the operation result of the lowpass filter operation.

Accordingly, from the initial state shown in FIG. 9(A), the release operation is carried out as shown in FIG. 9(B), and the circuit calibration operation is carried out as shown in FIG. 9(C). In addition, the head feed operation is carried out as shown in FIG. 9(D), the speed control operation is carried out as shown in FIG. 9(E), and the load operation is completed as shown in FIG. 9(F).

Figures 10A, 10B:
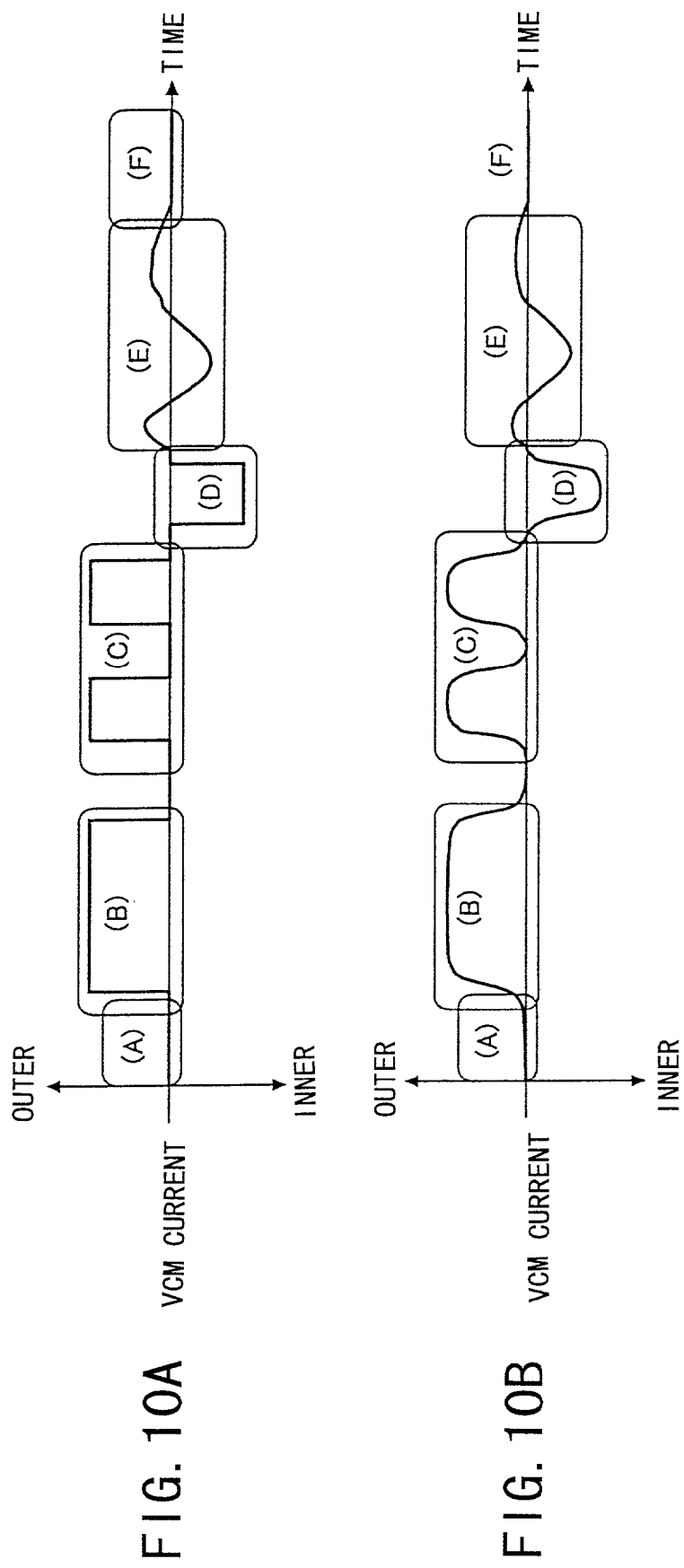
FIGS. 10A and 10B are diagrams respectively showing a VCM current during the load operation for a normal mode and a silent mode.

FIGS. 10A and 10B are diagrams respectively showing the VCM current during the load operation for the normal mode and the silent mode. FIG. 10A shows the VCM current for the normal mode, and FIG. 10B shows the VCM current for the silent mode. In FIGS. 10A and 10B, the ordinate indicates the VCM current in arbitrary units, and an upward direction indicates the VCM current having a polarity for moving the arm 114 towards the outer peripheral direction of the magnetic disk 111, while a downward direction indicates the VCM current having a polarity for moving the arm 114 towards the inner peripheral direction of the magnetic disk 111. Moreover, in FIGS. 10A and 10B, the abscissa indicates the time in arbitrary units. Furthermore, in FIGS. 10A and 10B, waveform portions corresponding to the states shown in FIGS. 9(A) through (F) are respectively denoted by the same reference characters (A) through (F). In the normal mode, the change in the VCM current is sharp at the waveform portions (B) through (F) as shown in FIG. 10A. But in the silent mode, the change in the VCM current is gradual at the waveform portions (B) through (F) as shown in FIG. 10B.

In other words, as may be seen from FIG. 10B, in the silent mode, the VCM current is controlled to change gradually during the load operation for at least the release operation which releases the arm 114 which is held in the unloaded state, the circuit calibration operation, the head feed operation which feeds the magnetic head 115 towards the magnetic disk 111, and the speed control operation which controls the speed when loading the magnetic head 115 on the desired track of the magnetic disk 111.

In addition, in the silent mode, the VCM current is controlled to change sharply during the load operation for at least the release operation which releases the arm 114 which is held in the unloaded state, the circuit calibration operation, the head feed operation which feeds the magnetic head 115 towards the magnetic disk 111, and the speed control operation which controls the speed when loading the magnetic head 115 on the desired track of the magnetic disk 111, so that the sharp change and the gradual change of the VCM current coexist. More particularly, the VCM current supplied to the VCM 113 may be controlled to change sharply for the head feed operation.

In the silent mode, if the VCM current is changed gradually during the load operation for all of the four kinds of operations described above, an unstable operation due to mechanical causes are likely to occur and the mechanical noise may become large. However, by changing the VCM current gradually for at least one of the four kinds of operations described above or, making the sharp change and the gradual change of the VCM current coexist, it is possible to prevent the large mechanical noise due to such an unstable operation.

Figure 11:
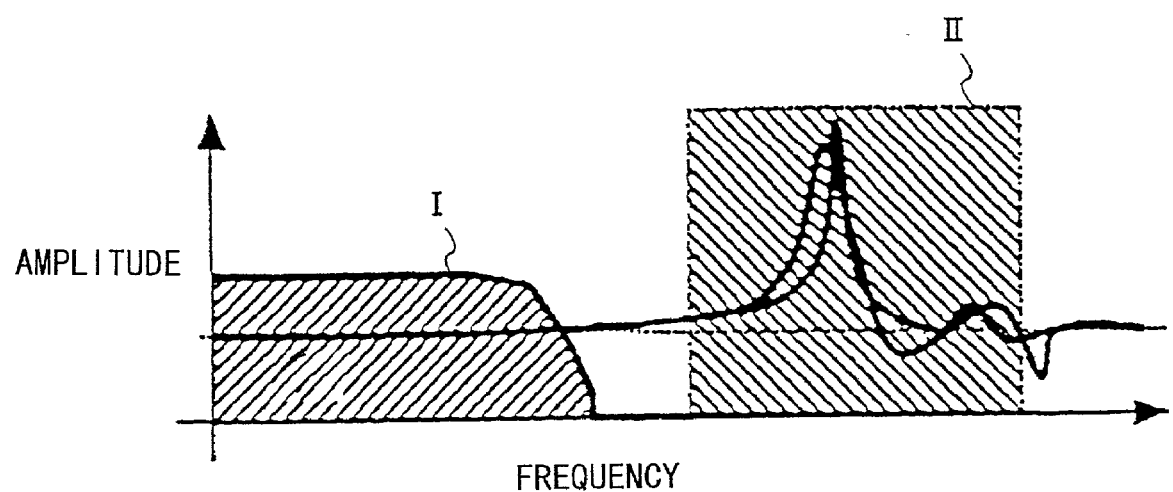
FIG. 11 is a diagram for explaining a filter characteristic of a lowpass filter.

FIG. 11 is a diagram for explaining a filter characteristic of the lowpass filter. In FIG. 11, the ordinate indicates the amplitude in arbitrary units, and the abscissa indicates the frequency in arbitrary units. When making the change of the VCM current gradual by use of the lowpass filter, it is desirable to carry out the filtering by avoiding a mechanical resonance point of the HDD 10. In FIG. 11, the filter characteristic of the lowpass filter, that is, the passband, is set so as to fall within a region I in which the change in the VCM current does not include the mechanical resonance point, by avoiding a mechanical resonance region II which includes the mechanical resonance point.

Figure 12A:
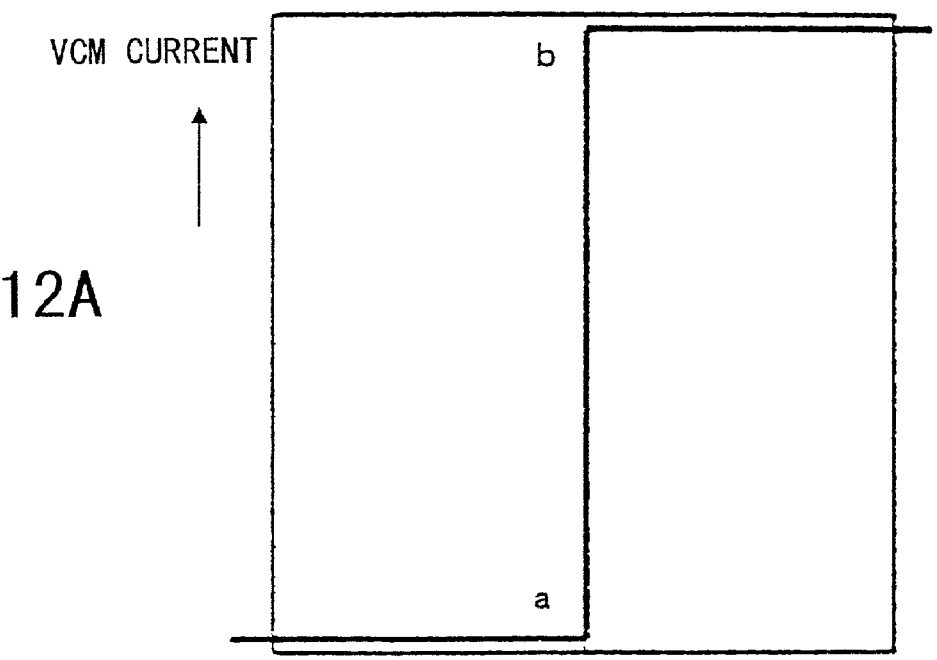
FIGS. 12A and 12B are diagrams respectively showing a relationship of the VCM current and mechanical noise during the normal mode.
Figure 12B:
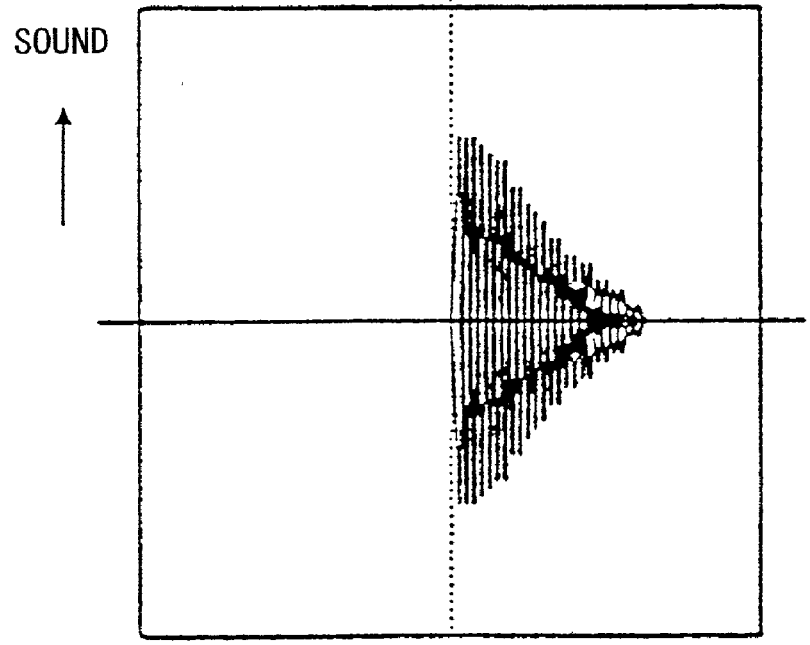

FIGS. 12A and 12B are diagrams respectively showing a relationship of the VCM current and the mechanical noise during the normal mode. FIG. 12A shows the VCM current which changes sharply, and the ordinate indicates the amplitude of the VCM current in arbitrary units and the abscissa indicates the time in arbitrary units. In addition, FIG. 12B shows the mechanical noise which is generated when the VCM current shown in FIG. 12A is used, and the ordinate indicates the sound (noise) amplitude in arbitrary units and the abscissa indicates the time in arbitrary units.

Figure 13A:
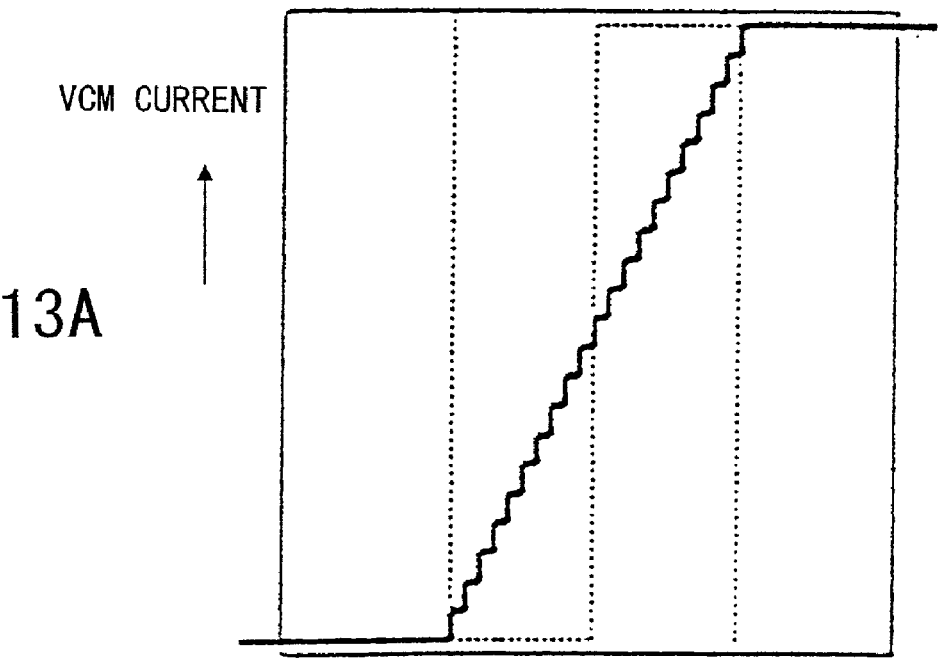
FIGS. 13A and 13B are diagrams respectively showing the relationship of the VCM current and the mechanical noise during the silent mode, for a case where an upper limit of steps of the VCM current is determined.
Figure 13B:
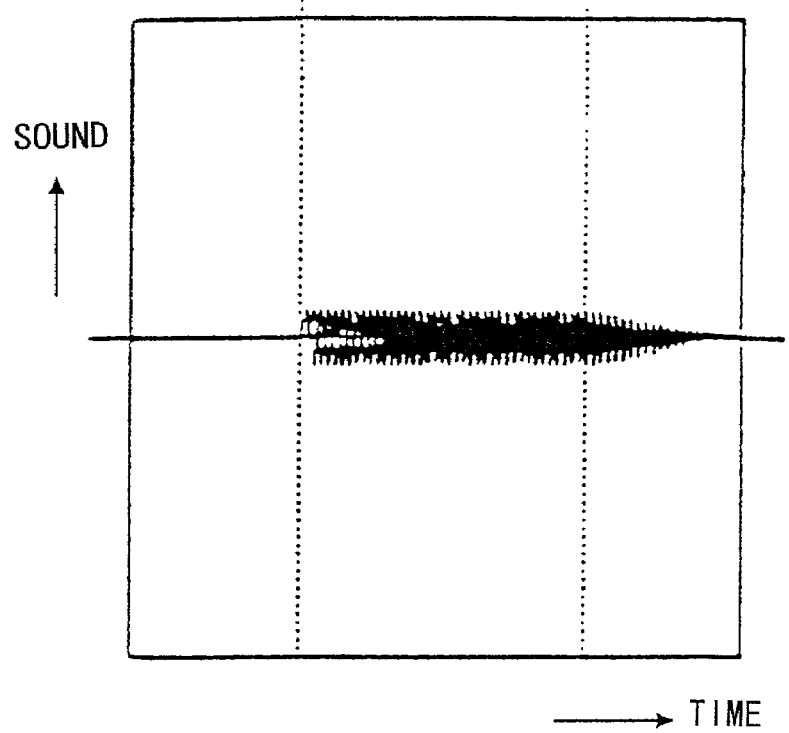

FIGS. 13A and 13B are diagrams respectively showing a relationship of the VCM current and the mechanical noise during the silent mode. FIG. 13A shows the VCM current which changes gradually, and the ordinate indicates the amplitude of the VCM current in arbitrary units and the abscissa indicates the time in arbitrary units. In addition, FIG. 13B shows the mechanical noise which is generated when the VCM current shown in FIG. 13A is used, and the ordinate indicates the sound (noise) amplitude in arbitrary units and the abscissa indicates the time in arbitrary units.

Figure 14A:
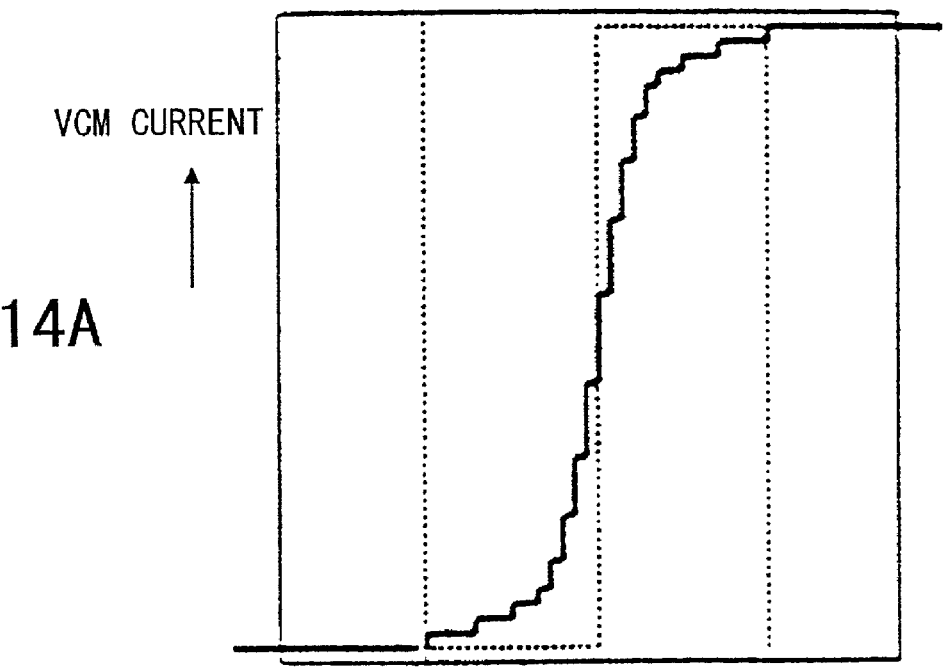
FIGS. 14A and 14B are diagrams respectively showing the relationship of the VCM current and the mechanical noise during the silent mode, for a case where the VCM current is passed through the lowpass filter.
Figure 14B:
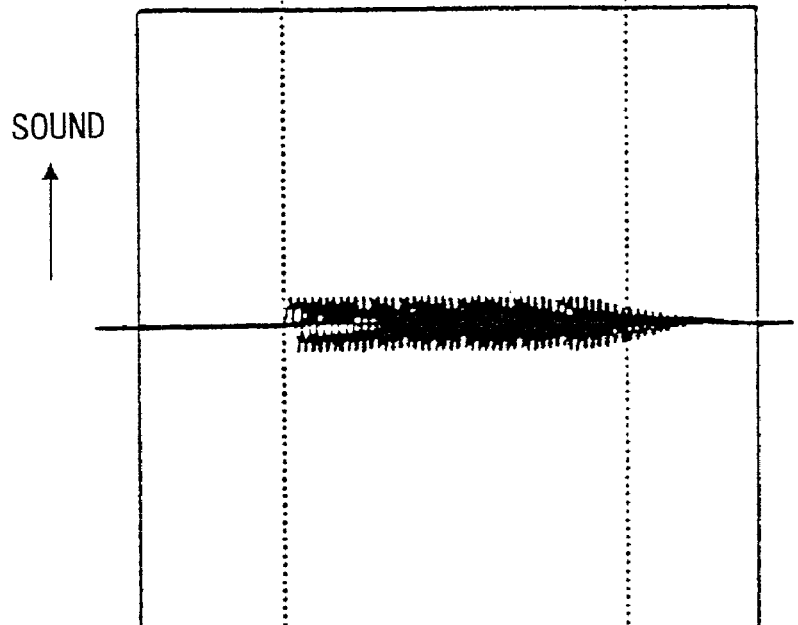

FIGS. 14A and 14B are diagrams respectively showing a relationship of the VCM current and the mechanical noise during the silent mode, for a case where the VCM current is passed through the lowpass filter. FIG. 14A shows the VCM current which changes gradually, and the ordinate indicates the amplitude of the VCM current in arbitrary units and the abscissa indicates the time in arbitrary units. In addition, FIG. 14B shows the mechanical noise which is generated when the VCM current shown in FIG. 14A is used, and the ordinate indicates the sound (noise) amplitude in arbitrary units and the abscissa indicates the time in arbitrary units.

Figure 15A:
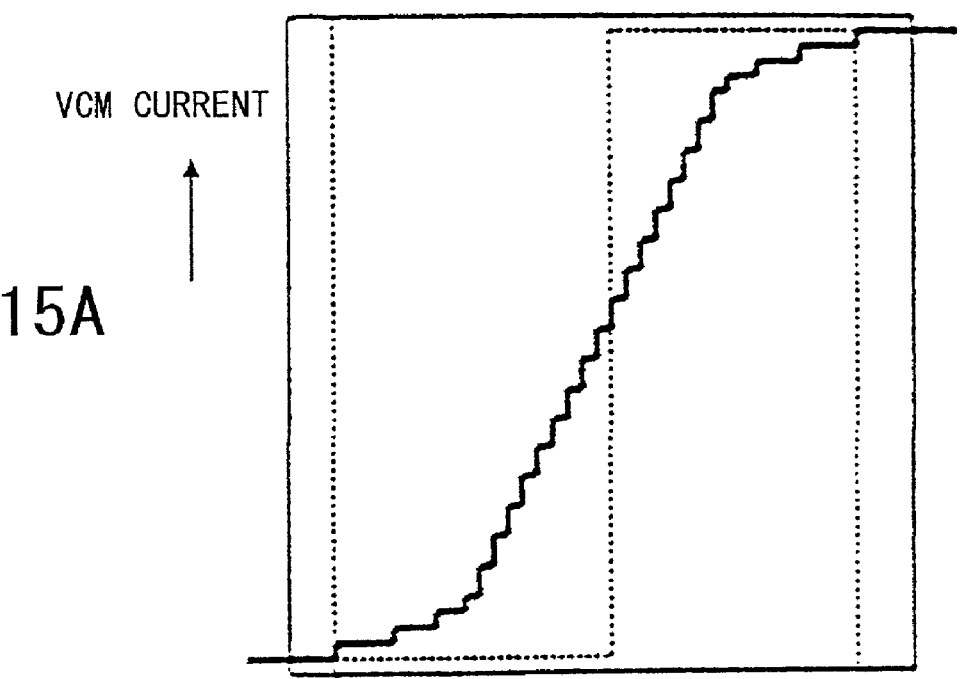
FIGS. 15A and 15B are diagrams respectively showing the relationship of the VCM current and the mechanical noise during the silent mode, for a case where the upper limit of the steps of the VCM current is determined and the VCM is passed through the lowpass filter.
Figure 15B:
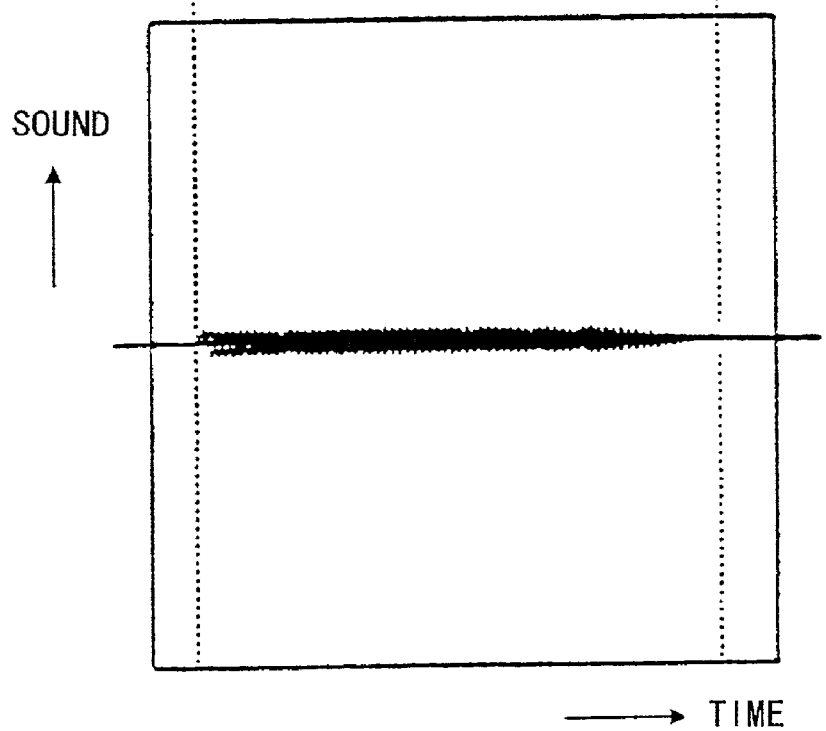

FIGS. 15A and 15B are diagrams respectively showing a relationship of the VCM current and the mechanical noise during the silent mode, for a case where the upper limit of the steps of the VCM current is determined and the VCM is passed through the lowpass filter. FIG. 15A shows the VCM current which changes gradually, and the ordinate indicates the amplitude of the VCM current in arbitrary units and the abscissa indicates the time in arbitrary units. In addition, FIG. 15B shows the mechanical noise which is generated when the VCM current shown in FIG. 15A is used, and the ordinate indicates the sound (noise) amplitude in arbitrary units and the abscissa indicates the time in arbitrary units.

As may be seen from FIGS. 11 through 15B, when the upper limit of the steps of the VCM current is determined and the VCM current is passed through the lowpass filter in the silent mode, it is possible to substantially eliminate the mechanical noise.

Figures 16A, 16B:
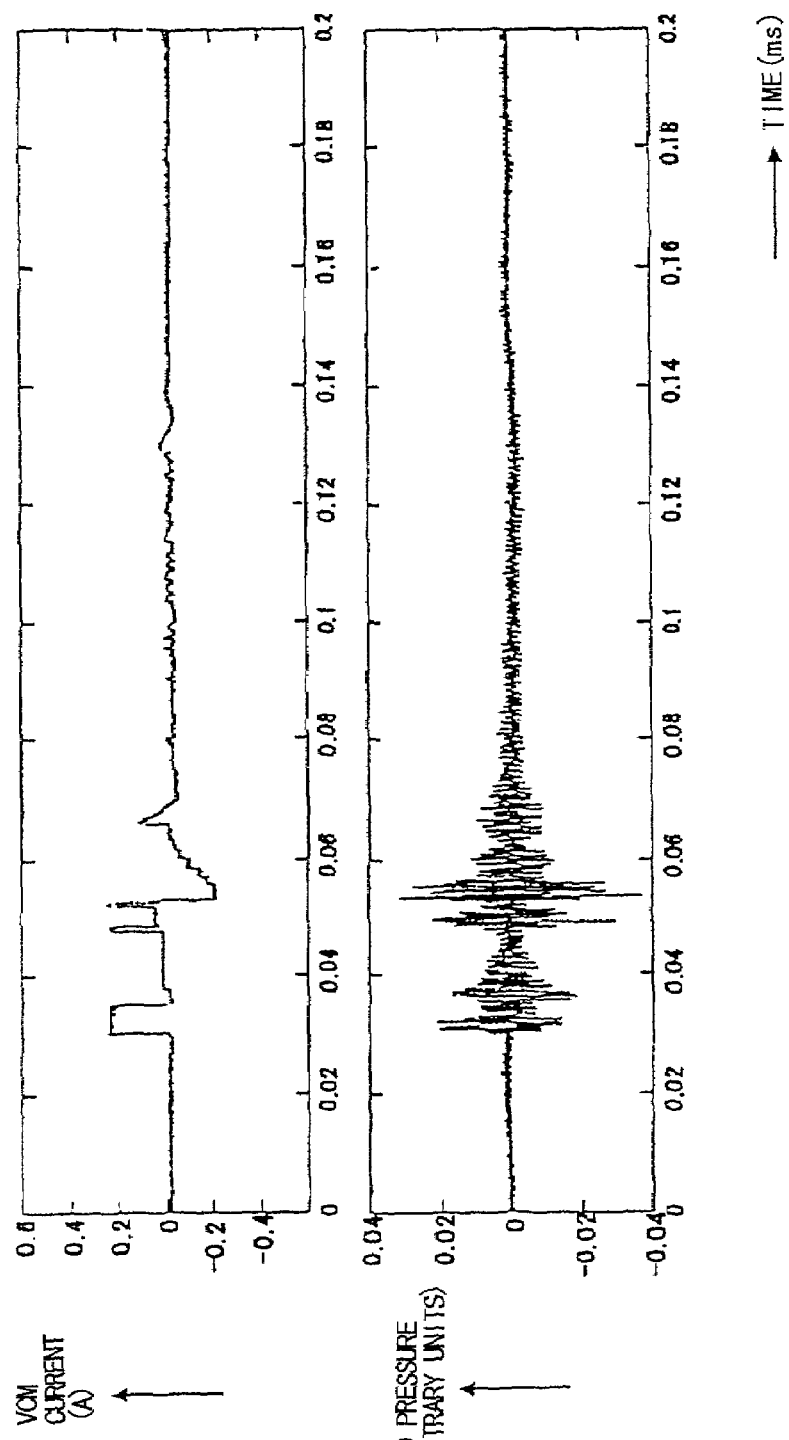
FIGS. 16A and 16B are diagrams respectively showing the relationship of the VCM current and the mechanical noise during the loading in the normal mode.
Figures 17A, 17B:
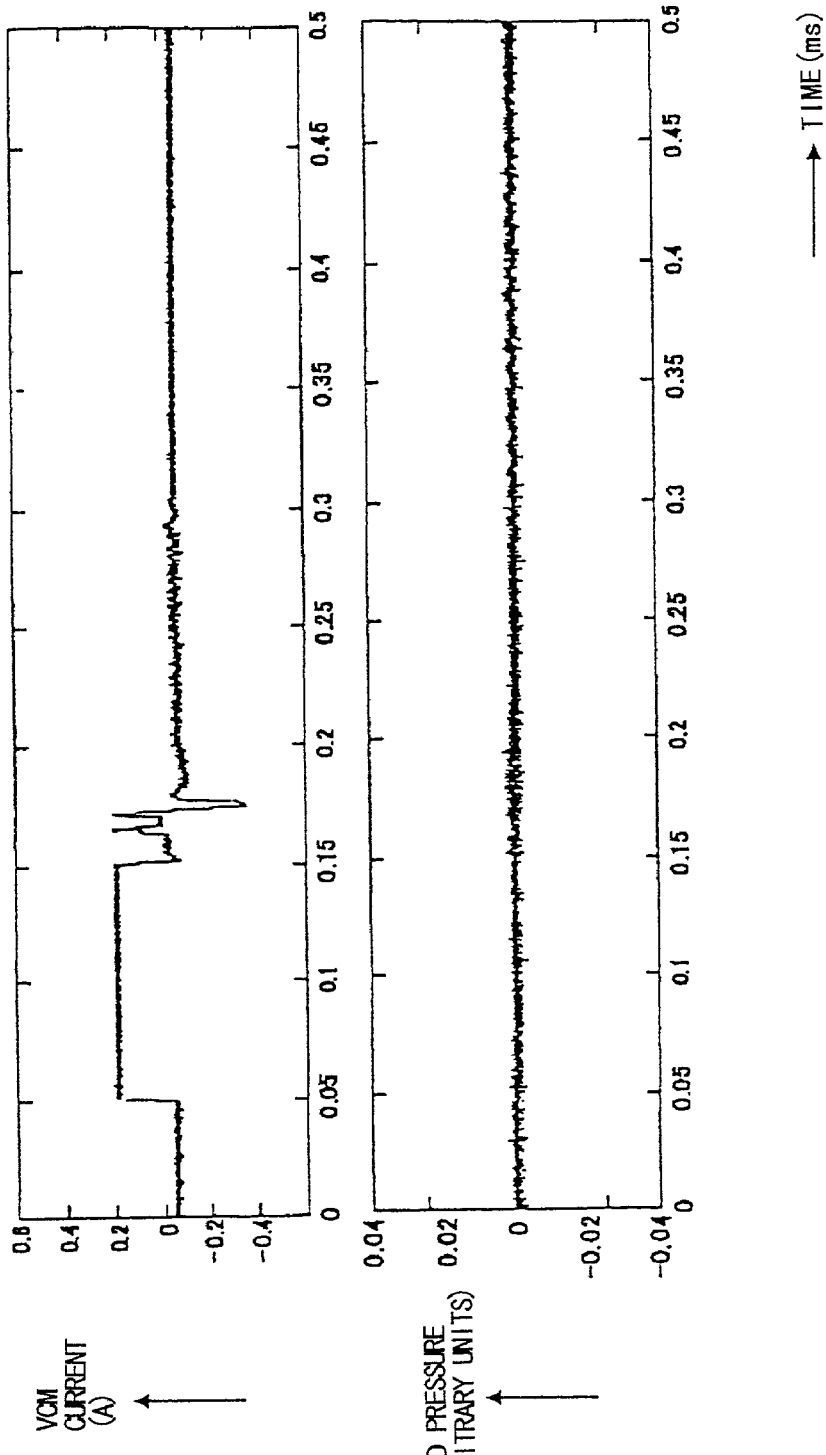
FIGS. 17A and 17B are diagrams respectively showing the relationship of the VCM current and the mechanical noise during the loading in the silent mode.

FIGS. 16A and 16B are diagrams respectively showing the relationship of the VCM current and the mechanical noise during the loading in the normal mode. In addition, FIGS. 17A and 17B are diagrams respectively showing the relationship of the VCM current and the mechanical noise during the loading in the silent mode. FIGS. 16A and 17A show the change in the amplitude of the VCM current with respect to the time, in arbitrary units. FIGS. 16B and 17B show the change in the amplitude of the mechanical noise (sound pressure) with respect to the time, in arbitrary units, when the VCM currents shown in FIGS. 16A and 17A are used, respectively. As may be seen from FIGS. 16A and 16B and FIGS. 17A and 17B, the generation of the mechanical noise is suppressed and the mechanical noise can be substantially eliminated in the silent mode because the change in the VCM current is gradual.

Figure 18:
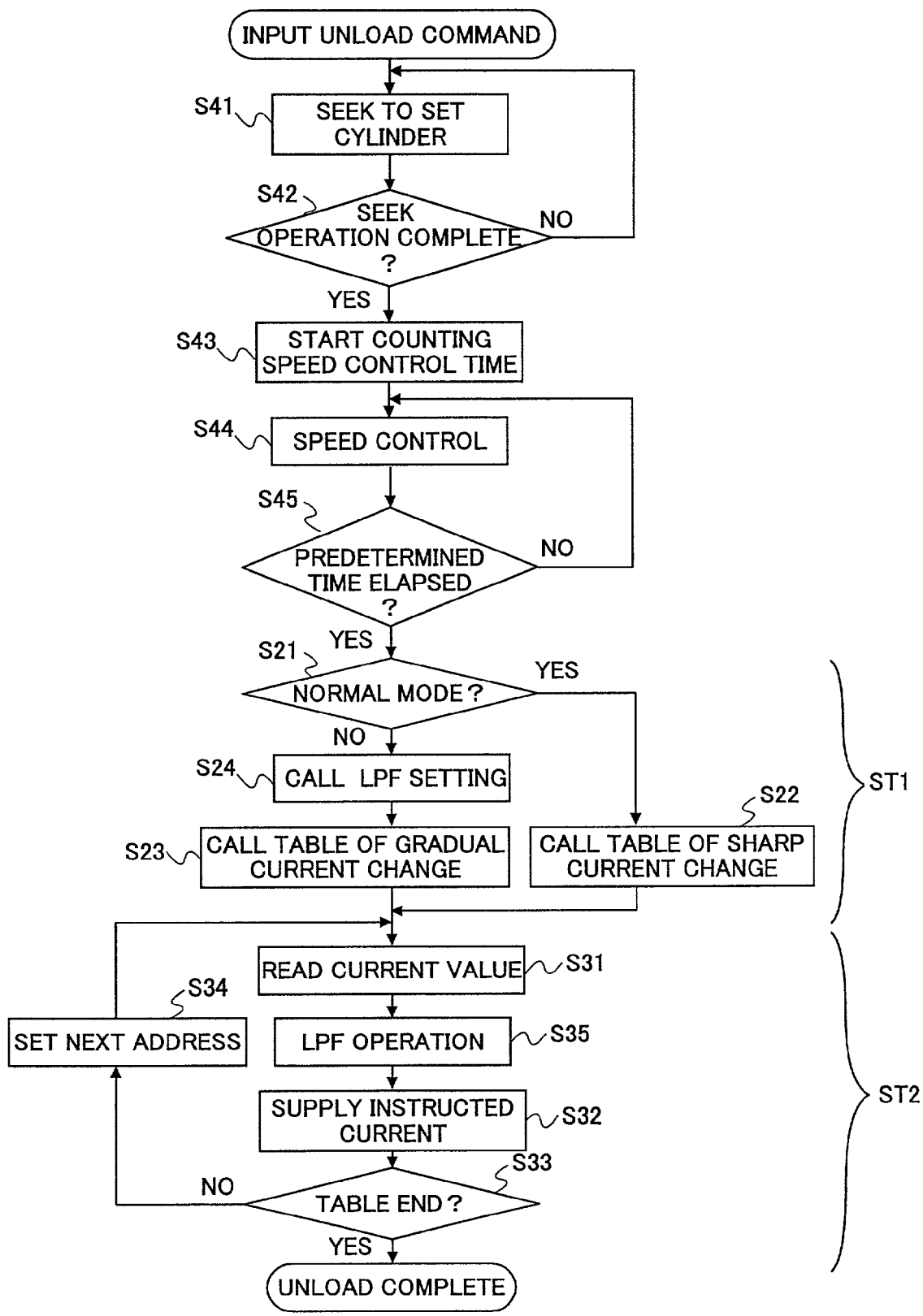
FIG. 18 is a flow chart for explaining an unload operation.
Figure 19:
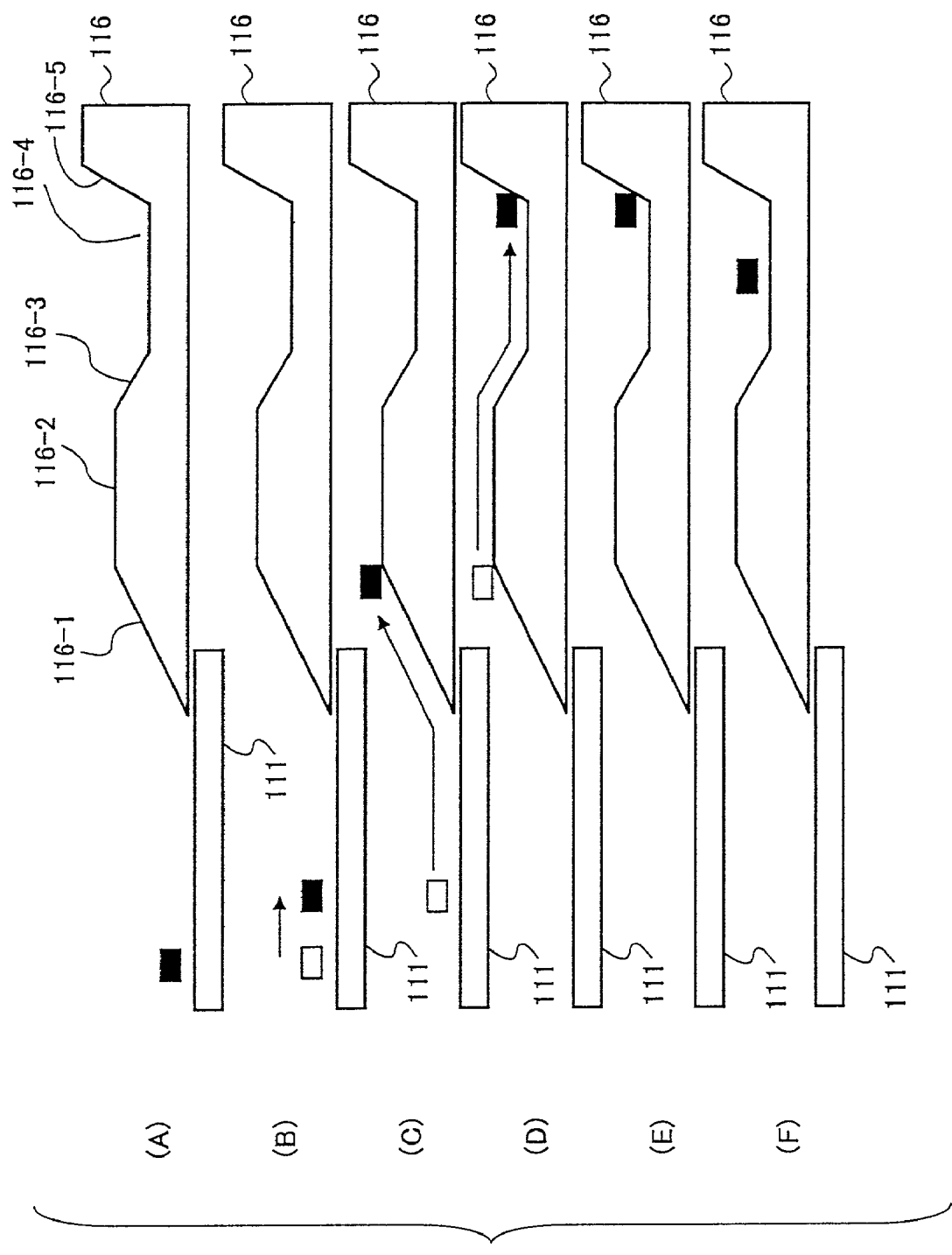
FIG. 19 is a diagram for explaining positions of the magnetic head during the unload operation.

Next, a description will be given of the unload operation of this embodiment, by referring to FIGS. 18 through 22B. FIG. 18 is a flow chart for explaining the unload operation of this embodiment. The process shown in FIG. 18 is carried out by the MPU 124 shown in FIG. 2. In FIG. 18, those steps which are the same as those corresponding steps in FIGS. 6 and 8 are designated by the same reference numerals, and a description thereof will be omitted. In addition, FIG. 19 is a diagram for explaining positions of the magnetic head 115 during the unload operation, and for the sake of convenience, the illustration of the arm 114 is omitted in FIG. 19. Further, the details of the ramp mechanism 116 is only shown in FIG. 19(A). As shown in FIG. 19(A), the ramp mechanism 116 includes a first sloping part 116-1, a horizontal part 116-2, a second sloping part 116-3, a parking area 116-4, and a terminal wall 116-5. In FIG. 19(A) through (F), the present position of the magnetic head 115 is indicated by a symbol "■", and the position of the magnetic head 115 before moving to the present position is indicated by a symbol "□".

In an initial state, the magnetic head 115 is located above an arbitrary track on the magnetic disk 111 as shown in FIG. 19(A). When carrying out the unload operation, the magnetic head 115 is first caused to seek from the arbitrary track of the magnetic disk 111 to a specific track (cylinder) of the magnetic disk 111 as shown in FIG. 19(B), so as to start the unload operation from this specific track.

In FIG. 18, a step S41 supplies an appropriate VCM current to the VCM 113, so as to make the magnetic head 115 seek to the specific track of the magnetic disk 111, that is, carry out a seek operation. A step S42 decides whether or not the seek operation is completed, and the process returns to the step S41 if the decision result in the step S42 is NO. On the other hand, if the decision result in the step S42 is YES, a step S43 starts to count a speed control time. A step S44 carries out a speed control operation similar to that carried out by the step S4 shown in FIG. 3, and controls the VCM current so that the arm 114 positively rides over the first sloping part 116-1 of the ramp mechanism 116 and reaches the parking area 116-4 via the horizontal part 116-2 and the second sloping part 116-3. A step S45 decides whether or not a predetermined time has elapsed from a time when the counting of the speed control time is started, and the process returns to the step S44 if the decision result in the step S45 is NO. On the other hand, if the decision result in the step S45 is YES, the process advances to a step ST1, and the process ends after carrying out a step ST2.

In FIG. 18, it is assumed for the sake of convenience that the step ST1 is the same as the third embodiment of the table calling process shown in FIG. 6, but it is of course possible to employ the first or second embodiment of the table calling process shown in FIG. 4 or 5. In addition, it is assumed for the sake of convenience in FIG. 18 that the step ST2 is the same as the second embodiment of the current instructing process shown in FIG. 8, but it is of course possible to employ the first embodiment of the current instructing process shown in FIG. 7 when first embodiment of the table calling process shown in FIG. 4 is employed for the step ST1.

Accordingly, from the initial state shown in FIG. 19(A), the seek operation to the specific track is carried out as shown in FIG. 19(B), and the speed control operation is carried out as shown in FIG. 19(C). In addition, the arm 114 hits the terminal wall 116-5 of the parking area 116-4 as shown in FIG. 19(D), the VCM current is supplied so as to push the arm 114 against the terminal wall 116-5 as shown in FIG. 19(E), and the arm 114 is held by the magnetic catch as shown in FIG. 19(F) so as to complete the unload operation.

FIGS. 20A and 20B are diagrams respectively showing the VCM current during the unload operation for the normal mode and the silent mode. FIG. 20A shows the VCM current for the normal mode, and FIG. 20B shows the VCM current for the silent mode. In FIGS. 20A and 20B, the ordinate indicates the VCM current in arbitrary units, and an upward direction indicates the VCM current having a polarity for moving the arm 114 towards the outer peripheral direction of the magnetic disk 111, while a downward direction indicates the VCM current having a polarity for moving the arm 114 towards the inner peripheral direction of the magnetic disk 111. Moreover, in FIGS. 20A and 20B, the abscissa indicates the time in arbitrary units. Furthermore, in FIGS. 20A and 20B, waveform portions corresponding to the states shown in FIGS. 19(A) through (F) are respectively denoted by the same reference characters (A) through (F). In the normal mode, the change in the VCM current is sharp at the waveform portion (F) as shown in FIG. 20A. But in the silent mode, the change in the VCM current is gradual at the waveform portion (F) as shown in FIG. 20B.

Figures 21A, 21B:
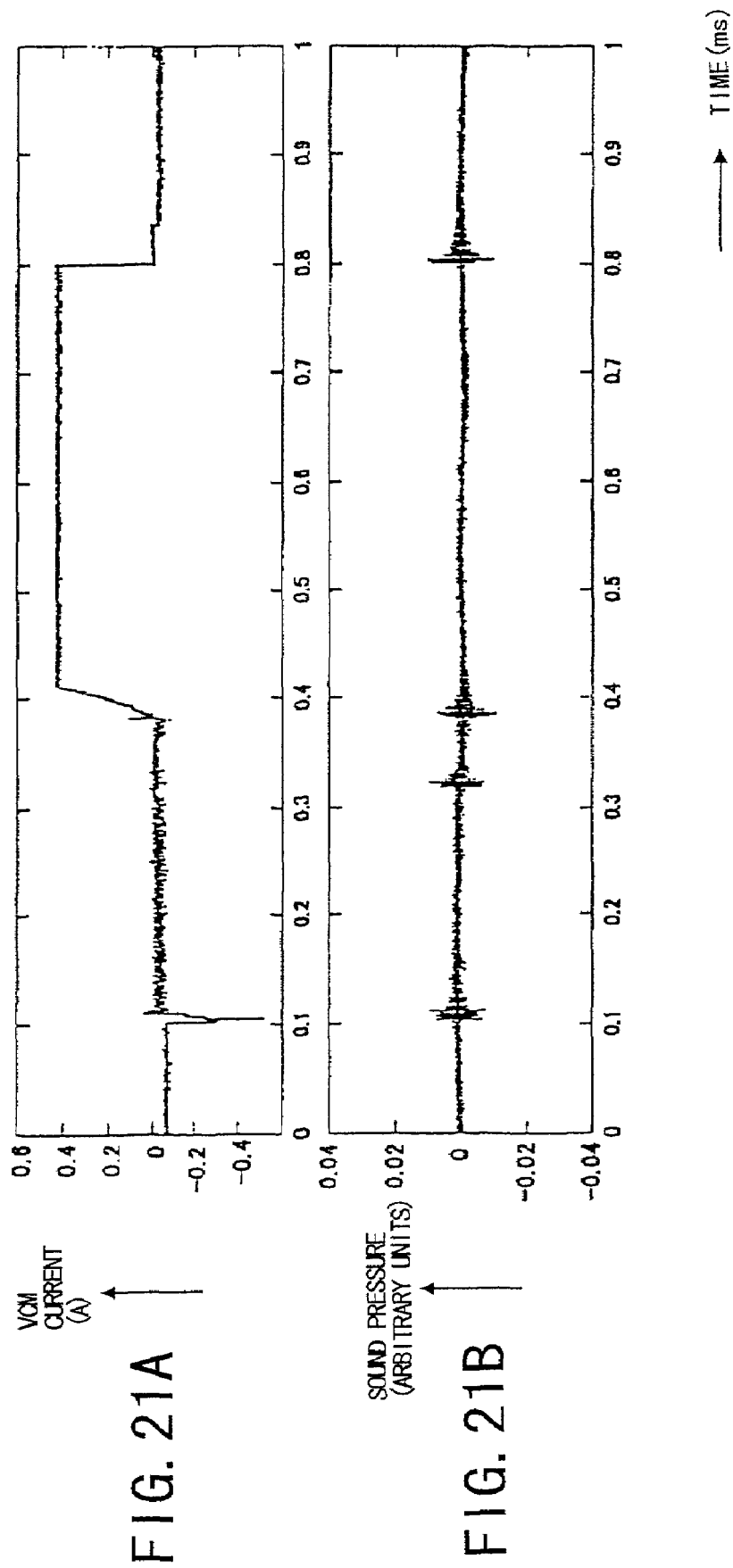
FIGS. 21A and 21B are diagrams respectively showing the relationship of the VCM current and the mechanical noise during the unload operation in the normal mode.
Figures 22A, 22B:
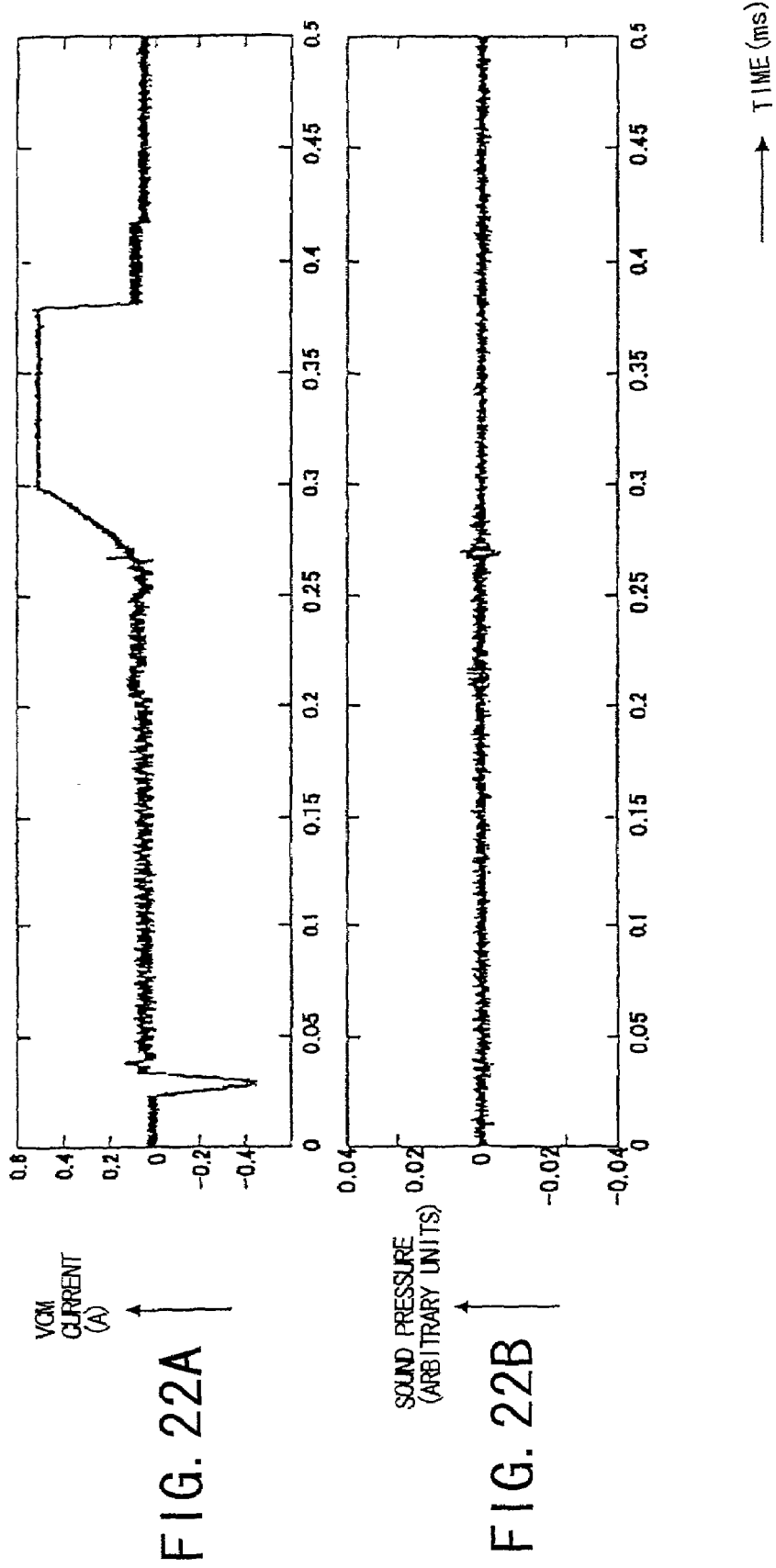
FIGS. 22A and 22B are diagrams respectively showing the relationship of the VCM current and the mechanical noise during the unload operation in the silent mode.

FIGS. 21A and 21B are diagrams respectively showing the relationship of the VCM current and the mechanical noise during the unload operation in the normal mode. In addition, FIGS. 22A and 22B are diagrams respectively showing the relationship of the VCM current and the mechanical noise during the unload operation in the silent mode. FIGS. 21A and 22A show the change in the amplitude of the VCM current with respect to the time, in arbitrary units. FIGS. 21B and 22B show the change in the amplitude of the mechanical noise (sound pressure) with respect to the time, in arbitrary units, when the VCM currents shown in FIGS. 21A and 22A are used, respectively. As may be seen from FIGS. 21A and 21B and FIGS. 21A and 22B, the generation of the mechanical noise is suppressed and the mechanical noise can be substantially eliminated in the silent mode because the change in the VCM current is gradual.

Therefore, according to this embodiment, it is possible to effectively suppress the generation of the mechanical noise in a similar manner, during both the unload operation and the load operation.

Of course, the control which is carried out to make the change of the VCM current gradual so as to suppress the generation of the mechanical noise, may be made during at least one of the load operation and the unload operation.

In the embodiment described above, the HDD 10 can be switched and set to the normal mode or the silent mode in which the generation of the mechanical noise is suppressed, by the LUL switch 130. However, when designing the HDD 10 so as to always operate in the silent mode, it is unnecessary to provide the LUL switch 130, and in this case, the steps S6, S7, S21 and S22 shown in FIGS. 3 through 6 and 18 may be omitted. In this case, if the decision result in the step S5 shown in FIG. 3 is NO, an error notification may be made by a known method or, the process may be returned to the step S1 after carrying out the step S6.

When the HDD 10 is designed so that the HDD 10 may be switched and set to the normal mode or the silent mode, the mode can be selected depending on the usage of the HDD 10 by the user and therefore very convenient for the user. Furthermore, even if the load/unload operation fails after a predetermined number of successive tries, for example, due to inconsistencies in the mechanical precision of the parts forming the HDD 10, there is an additional advantage in that the load/unload operation can positively be carried out by switching the mode from the silent mode to the normal mode.

The switching and setting of the mode to the silent mode or the normal mode is of course not limited to the method which uses the LUL switch 130. For example, the HDD 10 may be automatically switched and set to the silent mode or the normal mode depending on the operation mode of the HDD 10. In other words, the silent mode may automatically be selected during an operation mode of the HDD 10 which frequently carries out the load/unload operation, while the normal mode may automatically be selected during an operation mode of the HDD 10 which does not frequently carry out the load/unload operation.

In the embodiment described above, the magnetic disk 111 is formed by a hard disk, but the magnetic disk 111 is of course not limited to the hard disk. In addition, the application of the present invention is not limited to the magnetic disk unit, and the present invention is similarly applicable to any storage apparatus which is provided with the so-called ramp load/unload mechanism, such as an optical disk unit and a magneto-optical disk unit. Moreover, the recording medium is not limited to the magnetic disk.

Further, the present invention is not limited to these embodiments, but various variations and modifications may be made without departing from the scope of the present invention.

What is claimed is:

1. A load/unload operation control method for controlling a load/unload operation that loads/unloads a head which is provided on an arm with respect to a recording medium by a ramp load/unload mechanism, comprising:
    a control step controlling a driving current that is supplied to a driving part which drives the arm so as to undergo a gradual change during at least one of a load operation for a head feed operation which feeds the head towards the recording medium, and an unload operation as the unload operation is completed,
    wherein a gradual change in said driving current occurs at least during arbitrary times, other than a time when a speed control operation is carried out, said speed control operation controlling a speed of the head when the head is loaded to a desired track of the recording medium, and said arbitrary times including a time when said arm is released in a parking area by the head feed operation and/or when said arm is pushed in the parking area as the unload operation is completed.

2. The load/unload operation control method as claimed in claim 1, wherein said control step controls the driving current to undergo the gradual change during the load operation for at least one of a release operation which releases the arm which is held in an unloaded state, a circuit calibration operation, and the speed control operation.

3. The load/unload operation control method as claimed in claim 1, wherein said control step gradually changes the driving current by use of a lowpass filter.

4. The load/unload operation control method as claimed in claim 1, wherein said control step controls the driving current to change gradually only during a silent mode.

5. The load/unload operation control method as claimed in claim 1, further comprising:
    a mode judging step judging whether a mode is a silent mode or a normal mode,
    said control step controlling the driving current to change sharply when said mode judging step judges the mode as being the normal mode.

6. The load/unload operation control method as claimed in claim 2, wherein said control step controls the driving current to undergo a sharp change during the load operation for at least one of a release operation which releases the arm which is held in an unloaded state, a circuit calibration operation, a head feed operation which feeds the head towards the recording medium, and a speed control operation which controls a speed of the head when the head is loaded to a desired track of the recording medium.

7. The load/unload operation control method as claimed in claim 6, wherein said control step controls the driving current to undergo a sharp change during the load operation for the head feed operation.

8. The load/unload operation control method as claimed in claim 1, wherein said controlling step initially moves the head toward an outer peripheral direction of the recording medium during the load operation.

9. A storage apparatus comprising:
    a load/unload mechanism configured to carry out a ramp load/unload operation to load/unload a head that is provided on an arm with respect to a recording medium by a driving part which drives the arm; and
    a controller configured to control a driving current that is supplied to the driving part so as to undergo a gradual change during at least one of a load operation for a head feed operation which feeds the head toward the recording medium, and an unload operation as the unload operation is completed,
    wherein a gradual change in said driving current occurs at least during arbitrary times, other than a time when a speed control operation is carried out, said speed control operation controlling a speed of the head when the head is loaded to a desired track of the recording medium, and said arbitrary times including a time when said arm is released in a parking area by the head feed operation and/or when said arm is pushed in the parking area as the unload operation is completed.

10. The storage apparatus as claimed in claim 9, wherein said controller controls the driving current to undergo the gradual change during the load operation for at least one of a release operation which releases the arm which is held in an unloaded state, a circuit calibration operation, and the speed control operation.

11. The storage apparatus as claimed in claim 9, wherein said controller gradually changes the driving current by use of a lowpass filter.

12. The storage apparatus as claimed in claim 11, wherein the lowpass filter has a filter characteristic such that the change in the driving current falls within a region of the filter characteristic excluding a mechanical resonance point of the storage apparatus.

13. The storage apparatus as claimed in claim 9, wherein said controller controls the driving current to change gradually only during a silent mode.

14. The storage apparatus as claimed in claim 9, further comprising:
    mode judging means for judging whether a mode is a silent mode or a normal mode,
    said controller controlling the driving current to change sharply when said mode judging means judges the mode as being the normal mode.

15. The storage apparatus as claimed in claim 10, wherein said controller controls the driving current to undergo a sharp change during the load operation for at least one of a release operation which releases the arm which is held in an unloaded state, a circuit calibration operation, a head feed operation which feeds the head towards the recording medium, and a speed control operation which controls a speed of the head when the head is loaded to a desired track of the recording medium.

16. The storage apparatus as claimed in claim 15, wherein said controller controls the driving current to undergo a sharp change during the load operation for the head feed operation.

17. The storage apparatus as claimed in claim 9, wherein the controller initially moves the head toward an outer peripheral direction of the recording medium during the load operation.

* * * * *